United States Patent [19]
Siegrist et al.

[11] Patent Number: 5,792,483
[45] Date of Patent: Aug. 11, 1998

[54] INJECTION MOLDING MACHINE WITH AN ELECTRIC DRIVE

[75] Inventors: Ronald Siegrist, Oberuzwil; Bruno Stillhard, St. Gallen; Hugo Blöchlinger, Flawil, all of Switzerland

[73] Assignee: Vickers, Inc., Maumee, Ohio

[21] Appl. No.: 367,003

[22] Filed: Aug. 21, 1995

Related U.S. Application Data

[63] Continuation-in-part of Ser. No. 318,607, Jan. 7, 1995, abandoned.

[30] Foreign Application Priority Data

Apr. 5, 1993 [CH] Switzerland ............ 1 036/93
Sep. 11, 1993 [CH] Switzerland ............ 2 733/93

[51] Int. Cl.$^6$ .................................................. B29C 45/76
[52] U.S. Cl. .................. 425/135; 364/475.05; 425/162
[58] Field of Search .................. 264/40.1, 40.5, 264/40.7, 328.1; 425/135, 145, 149, 150, 155, 161, 162, 165, 166, 167; 364/476, 475.02, 475.05, 475.08, 475.09

[56] References Cited

U.S. PATENT DOCUMENTS

| 4,772,830 | 9/1988 | Kobari et al. ............ 425/162 |
| 5,251,146 | 10/1993 | Neko et al. ............ 264/40.7 |
| 5,256,345 | 10/1993 | Yokota ............ 264/40.1 |

FOREIGN PATENT DOCUMENTS

| 167631 | 1/1986 | European Pat. Off. . |
| 528040 | 2/1993 | European Pat. Off. . |
| 3-47726 | 2/1991 | Japan . |

*Primary Examiner*—Jill L. Heitbrink
*Attorney, Agent, or Firm*—Finnegan, Henderson, Farabow, Garrett & Dunner

[57] ABSTRACT

A drive control apparatus for controlling a plurality of control variables of at least one electrically powered axle of a processing machine, such as an injection molding machine. Multivariable control means including internal signal processing and date storage means for an open and closed-loop control of phase angle, current input and velocity are dominating process computer means for a lag-free control of the control variables.

10 Claims, 15 Drawing Sheets

INJECTION MOLDING MACHINE WITH AN ELECTRIC DRIVE

REFERENCE TO RELATED APPLICATIONS

This is a continuation-in-part of applications Ser. No. 08/318,607, filed Jan. 7, 1995, now abandoned (U.S. National Phase of International Application PCT/CH93/00251 commenced Oct. 27, 1993).

BACKGROUND OF THE INVENTION a. Field of the Invention

The invention, in general, relates to a novel controlled drive arrangement for use in connection with drive shafts, hereinafter sometimes referred to as "axles", powered by electric motors, or for controlling the input signals to one or more of such drive motors, and comprising an open or closed loop control including one or more internal signal processing means capable of performing the functions of phase angle adjustment ($\phi$), current control (I), and velocity control (V). More particularly, the invention relates to a controlled drive for an injection molding machine comprising a plurality of axles or drive shafts, including an injection screw rotatably driven by an electric motor and axially displaceable by mechanical action, a data transmission system and computer means, as well as to a method of controlling the operation of such an injection molding machine.

b. Statement of the Prior Art

Control technology has experienced significant changes during the last two decades. For a long time, closed-loop control systems were considered superior to simple, i.e. open-loop controls. Where highest qualities are aimed at, the control technology ordinarily requires a superior knowledge or familiarity with the production process. Closed-loop controls are often utilized where the parameters affecting a process are either not known or they are not wholly known. Far into the 80's, the use of process control computers was considered to represent the ultimate state of development. All major functions were centrally coordinated and controlled by a process control computer on the basis of signals derived from sensors of a processing machine or from monitored product parameters. Those systems were subsequently replaced by so-called stored program controllers (including random access memories) supplemented by processors for more complex calculations. These controllers had control and interlocking functions and, sometimes, start-up and initiation programs allocated to them. The processor controlled some portion of the process control. For some time now, servomotors have been applied to many processing machines, including injection molding machines. Their motor-generated rotary movement is converted into, and applied as, an axial or linear movement, as required. The electric field ($\phi$) and the current (I) or a commensurate control over the motor shaft torque, its position and velocity, may be controlled with surprising accuracy with such servomotors on the basis of predetermined desired values by means of an interpolator. One drawback, however, is that the relatively complex intelligence required for such controls may only be available from highly specialized manufacturers, for the complexity of its components makes it necessary that the lay-out or design of an open and closed loop control for servomotors in such drive systems is devised from specially developed microelectronics.

The structural unit including the velocity controller and, in particular, the current or torque adjustment members as well as the corresponding commutator function will be described as a motor controller which, together with the mains connection and various converters, represents an individual drive. It is important that the drive is equipped with a current controller.

Nowadays, a complete open or closed loop machine control system, such as those used in connection with electrically driven injection molding machines, is usually equipped with so-called CNC controls having an interpolator arranged therein. An interpolator is a computer for the drive with a high computing power. To perform their various functions, the servomotors are distributed about the entire machine. The coordinated control devices, hereinafter "drives", may be consolidated into a single group or module. Either frequential (digital) or analog signals are transmitted from the interpolators to each drive by way of required cables. Analog signals are transmitted as voltages in a range of ±10 volts. The disadvantage of such a system is that the transmission of data per se represents a problem complex. The signal cables, and especially those transmitting control signals, have to be especially protected from noise and other interference fields. The otherwise very advantageous buslines can either not be used at all or on a limited scale only, because the speed of data transmission can no longer be guaranteed. At the present time, interpolators integrated into CNC controls represent the optimum solution, with the systems as a whole being utilized to their maximum capacity. The drives share a common principle: They incorporate a central computer or processing unit transmitting all control signals for affecting the shafts and receiving all the data representative of the control variables or parameters. For this reason such known controls suffer from the mentioned disadvantage.

Injection molding machines are used for producing moldings, for example from thermoplastic materials. The usually pelletized raw material is melted in a heating cylinder or screw barrel by a plasticizing screw and is extruded into a mold by axial or longitudinal displacement of the plasticizing screw. The mold is a cavity in a tool which usually consists of two sections maintained in a closed state at a predetermined closing force by a movable and a stationary support plate. For removing a molded article from the cavity the movable mold section is driven to a mold-open position, followed by removal of the article or molding from the cavity by an ejector. This operation is cyclically repeated. The movements of the mold section and of the ejector are not truly process dependent, and should, for the sake of productivity, be performed very rapidly, i.e. in as short a time as possible. Together, the movements which are independent of the process constitute a so-called dry cycle. Typical dry cycles in modern injection molding machines with a mold closing force of 100 t are about 1.4 to 2.9 seconds. The dry cycle is one of the main factors limiting productivity.

Injection molding machines are usually driven hydraulically, utilizing a hydraulic oil. Hydraulic drives are advantageous in the sense that they easily and in a controlled manner convert energy, delivered through a valve by an electrically driven pump as hydraulic fluid pressure into a hydraulic cylinder, into linear movements and high forces. But their relatively poor overall efficiency which in the case of injection molding machines is about 20 to 40%, depending on the load, is a disadvantage. Their power loss is usually absorbed by heat sinks, such as oil or water coolers. Oil operating hydraulic apparatus operates at high noise levels. A further problem resides in the fluid leakages typical to a greater or lesser extent of all oil hydraulic apparatus. Since hydraulic oils are almost exclusively derived from mineral oils they constitute an environmental hazard.

Although the useful life of hydraulic oils may in normal circumstances extend over several years, problems arise in connection with their eventual disposal.

In recent years, electrically driven injection molding machines have been proposed. They are characterized by much lower energy consumption, yet they have not in general found worldwide acceptance. A mechanical transmission is required to transform the rotary movement of their motors into the linear movement required in an injection molding machine. In machine tools, two apparatus are known for converting the rotary movement of an electric motor into a linear movement: the threaded spindle and the toothed rack. Since the torque of the motor must be converted into a closing force, in fully electrically operated injection molding machines, toggle levers or linkages are basically the only kind of component useful in clamping units. Depending upon the design of the toggle lever geometry, power ratios of up to a factor of 50 are possible. A ball bearing spindle preceded by a transmission, for example, serves to drive the cross head. Such machines are designed for operating with the shortest possible dry cycle times. However, practical performance values do not reach the level of corresponding peak values of hydraulically operated machines.

Contrary to expectations, it has not been possible to date with electric drives sufficiently to control the truly critical phases in an injection molding machine operation of the back pressure build-up during plasticization and to maintain pressure during the holding phase, for instance. In this respect, many proposals have recently been advanced. By drawing upon different detector pulses representative of the position of the spindle or plasticizing screw, attempts have been made to control the injection charge and the injection pressure (see, e.g., European Patents Nos.: 216,940; 217, 963; 167,631; and 249,641) by open or closed is loop control of the velocity or acceleration parameters, as the case may be, by way of the torque control of the drive motor. Attempts have been made step by step to eliminate deviations, or errors resulting therefrom, by a plurality of special corrective measures by using an error register (see, e.g., European Patent No.: 280,734). In a manner similar to those of hydraulic actuators or drives, such methods are based upon the drive torque for controlling the injection force or the injection pressure. From the point of view of physics, a more or less direct connection may be expected to exist between a torque signal transmitted to a drive (closed and open loop motor controller) and the resultant or attainable injection pressure. Such methods suffer from great disadvantages, however. For only in theory is it possible to obtain an open or closed loop power control by way of an analog motor current limiting input at the drives (electronic control of the servo motor). The following boundary conditions mitigate against a more accurate power control or against following preset desired values exactly:

Firstly: The static actual force is greatly interfered with by unpredictable frictional forces. They distort the torque signal over the path starting with the conversion of the motor current into torque and continuing to the transmitted forces or pressures.

Secondly: In contrast to hydraulic systems, inertial or mass forces have a much greater effect during changeover from the injection pressure to the dwell or holding pressure. In concert with the mass of molten resilient plastic within the screw barrel, the moving masses act as a low-frequency mass or spring resonator. As a result, the production of precise or thin-walled moldings is particularly difficult, often even impossible. The quality of the molding is limited by the control of all parameters, for example during the injecting and during plasticizing, but especially during the transitional phases from injection to holding and from holding to plasticization.

During movement of the injector unit or aggregate, the nozzle contact force must be carefully controlled. In injection molding operations, the injection per se constitutes a key problem, for it must be executed at a controlled velocity, at high pressure and properly timed. The plasticizing screw can generate an injection pressure in excess of 2,000 bar. An important object resides in precisely positioning the plasticizing screw in particular. During an injection, the velocity of the forward movement of the screw must be controlled during the mold-filling phase. On the other hand, the holding or dwell pressure phase necessitates a controlled injection or dwell pressure. The respective actual value is derived from one or more measuring devices.

OBJECTS OF THE INVENTION

It is an object of the invention to provide improved controls for the operating sequence of machines, particularly of processing machines, by servomotors, to yield, depending on a particular operation, improved quantitative and qualitative productivity and/or reproducibility.

A further object resides in improved operational control management to provide improved quantitative output without sacrificing quality, and to provide for especially high precision and reproducibility regarding all essential parameters, for instance in injection molding processes, so that even thin-walled moldings of the highest precision, for instance drinking cups having a wall thickness of 0.4 mm can be manufactured in very short operating cycles.

Other objects will in part be obvious and will in part appear hereinafter.

BRIEF SUMMARY OF THE INVENTION

The solution according to the invention is characterized in that a velocity command signal (or a desired movement signal) to a drive is selected as a command signal and that for the pressure or dwell-pressure phase and/or the plasticization phase, the limits of the movement are controlled or defined at the same time, preferably non-linearly. In accordance with the invention the movement of the rotor is controlled by a velocity signal to the drive (as command signal), by modulating the position of the rotor or a resultant magnetic field of the electric servomotor during the dwell pressure and/or during the plasticization phase. Furthermore, in accordance with the invention the force or the pressure during the dwell pressure and/or plasticization phase is controlled by a velocity signal to the drive (as command signal) by modulating the position of the rotor or the resultant magnetic field of the electric servomotor, the target variables (pressure and/or velocity) being preferably controlled as a function of time or of the extent of axial displacement of the injection screw.

The invention has led to the realization that too great a similarity has hitherto been assumed to exist between hydraulic and electrical systems. It had been overlooked that between the electrical system and the behavior of the machine as a whole and, more particularly, of the injection material, basic physical principles are active which cannot reasonably be taken into consideration by retro-active error correction programs. It has now been realized that a system incorporating an electrically driven injection screw has the following characteristics:

The plastic melt is a resilient material which, like a spring, can be compressed by more than 20% at a pressure of up to more than 2,000 bar. The fact that the entire plastic melt in the mold and in the injection cylinder acts resiliently has an even worse effect in that, because of this resiliency, the injection screw can move in the injection cylinder in a stroke of up to several centimeters. The precise position of the injection screw is dependent, among other things, on the instantaneous pressure in the plastic melt. The pressure varies when the system is oscillating. Prior art solutions react to changes in desired torque or injection pressure values with an oscillation frequency of 2.5 Hz. Such action represents a significant problem area and complicates any quick and precise control of the injection pressure.

By comparison, the mechanical transmission between servomotor and injection screw may be assumed to be a rigid incompressible body reacting only to any mechanical/geometric reciprocal action.

The rotor and the mechanical drive train are real masses subject to the mass moment of inertia, in particular the rotor which, though itself a relatively small mass, yet in a dynamic sense it embodies a significant moment of inertia.

Where the injection screw is controlled by a change in the driving torque of the servomotor, it has to be in accordance with the principle: mass x acceleration, or on the basis of the equation $W=mv^2/2$ ($W$=energy, $v$=velocity, $m$=mass). A change of velocity of the mass or a great acceleration requires a corresponding force. Applying a force to the mechanical components (by way of motor torque) not only produces a force or pressure on the injection molding machine, but also strong and, in concert with other factors, such as friction etc., uncontrollable oscillations. However, the oscillation frequency cannot be calculated in advance as it depends on the effective quantity of injection material, on the specific tools, the quality of the plastic material, the temperature or the time, etc.

Since in the final analysis the functional unit of the injection system, including the mold and the mold support elements of the injection molding machine, as a whole constitutes a pronounced oscillating system, the approach of a systems operation on the basis of an open or closed loop drive torque control is incorrect.

In one embodiment, the invention provides for a separately mountable module spatially separated from a machine computer, for the autonomous open or closed loop control of the axles or drive shafts, the module being provided, aside from one or more signal processors, with a primary or master processor dominating the signal processors and arranged for an instantaneous real time or simultaneous open or closed loop control of the axles and receiving its necessary information from a storage memory provided in the module.

In another embodiment the invention provides for a multiple or multivariable control unit spatially separated and independent of a machine computer, for the autonomous open or closed loop control of the parameters or control variables, which in addition to the signal processor comprises a primary or master processor dominating the signal processor and which is arranged for an instantaneous selective real time open or closed loop control of the parameters and which receives its necessary information from a storage memory provided in the multiple control unit.

Moreover, a controlled drive of the kind herein disclosed may be used to control robots, including welding robots, die cast machinery, cranes or derricks, injection molding machines, casting and pressing machines, textile and paper processing machines as well as machine tools.

The servo control drive in accordance with the invention thus comprises a control unit including a drive intelligence provided with a primary processor, as well as a storage or active storage for menus or programs, arranged to control at least two axles. It has been realized that the latest developments have been based upon wrong assumptions. This may readily be explained using the spatial movements of a crane or robot as a model. The robot gripper usually moves in three directions. It has been assumed that the resultant movement of the gripper of the robot can be controlled by controlling every part of movement in every one of the three dimensions (at three axles). The only requirement was assumed to be a processor sufficiently fast to issue correct command signals to every drive. The assumption that the calculation of the dimensional curve was sufficiently exact, led to the further assumption that the result would be absolutely correct. However, in practice this is by no means so. As is known, variable mass inertia, frictional forces and other resistances or impediments occur and were sought to be eliminated by extremely large error correction programs, often with only partial success. The first erroneous assumption was that the problem was considered to be a three dimensional one, and it was therefore reduced to the three dimensions. In reality, the problem is more than one of three dimensions, for at changes in velocity time will act like, or invoke, a fourth dimension. Therefore, mathematical approaches based on only three dimensions are incorrect. The second erroneous assumption was that in the presence of friction, changing inertial forces, varying velocities and so forth, the factor of mutual interdependency of the three spatial dimensions is very large. In the microrange (μsec/μmm, etc.), where the influence of non-logical functions is particularly strong, it is impossible to control operational processes by way of a rigid or static open or closed loop control logic. The third, and perhaps most serious, erroneous assumption was that the efficiency or processing speed of processing units, and the transmission of signals in data transmission systems, occurs at the speed of light, i.e., sufficiently fast that render the location where the data is processed within a given system irrelevant. Therefore, near simultaneity was simply assumed. In practice many cases demonstrated that all complex data transmission systems require relatively large intervals of, in certain circumstances, several seconds from the initial signal release to the execution of a command. This is a function of the many interfaces and conversions, for instance, but also of such transmission safety features as the confirmation of transmission and reception. In complex systems a plurality of calculations would often have to be performed simultaneously. However, the addition even of very small time delays results in a sluggish system which is but poorly suitable for control functions. The basic error was that the internal control functions of a servo control drive were processed remote from the locus of actual process and operations controls.

It has now been realized that a solution can only be offered by a corrective action for an open or closed loop process control which is performed spatially as close as possible to an operational site and in as quick a manner as possible. The interaction has to be immediate and in situ, i.e. within every one of the open and closed loop control drives. Where a common control unit or a common processing unit is in close proximity with the drives, the field control as well as current, position and velocity controls of all drives can be coordinated. The specific lay-out of known drive computers comes close to accommodating a common or integrated control unit. Such drives are already equipped with an internal φ-control unit as well as I-, V- and position control units. Even with forces changing significantly in a machine, such control units provide very high positioning accuracy in a given time period, for instance. As an interpolator the control unit can, for instance, coordinate the positional control units of two or three axles or drive shafts almost without any time lag. For that purpose, the control unit is provided with a drive intelligence having the required computing capacity. All directly required values are available in situ to the control as complete menus or programs. This, in the context of a preset menu, results in a functional unit which as a highly sensitive computer can operate on or control two axles. Thus, the communication system is no longer over-loaded and, conversely, the process control is no longer delayed. The synchronization of two or more controlled axles can thus be ensured to a degree of accuracy heretofore unknown. In accordance with the invention, a true and simultaneous cooperation of all axles is possible since there is neither a spatial separation nor a disadvantageous data transmission over a bus for the actual control function. Advantageously, the multiple or multivariable drive is utilized as an integral structure with an integrated program storage and preferably digital signal processing drive computer for multi-axially synchronizing movement and/or path curves for a machine driven electrically by a plurality of servomotors. Hitherto, the processing unit was utilized as an independent "brain" which controlled a process by way a required number of sensors. Utilizing servomotors, it has now become possible to derive from the signal processor values representative of the actual position or the actual velocity. In accordance with the invention, the process controller and the signal processors operate as an integral functional unit as an intelligent "in situ control" on the basis of menus allocated to, or stored within, them. As will be shown hereinafter, the invention provides for selective control, in an open or in a closed loop, of any parameter or control variable at any given time, such as the movement of a robot, an injection screw, or the hook of a crane.

It is well known that the position of the rotor in a servomotor can be controlled with great precision, particularly in preferred brushless servomotors, such as, for instance, electronically commutated brushless motors available under the trademark "Fastact". These types of drives or motors are distinguished by highly dynamic stiff velocity or position controls. The rotor in combination with the drive may; therefore, be considered as a body fixed in a magnetic field which because of its relatively small mass and the disproportionately large electromagnetic forces available, may also be considered to follow changes in the magnetic field almost simultaneously. Magnetic field and position of the rotor can be controlled with an extraordinarily high rate of repetition or a corresponding alternation, so that low-frequency oscillations of the system are prevented by the invention. Signal changes may take place at frequencies in excess of 100 Hz. A given program trajectory can be followed rapidly and accurately. The entire corresponding processing operation can be subjected to almost complete open and/or closed loop control by an effective motion control. Instead of alternating force pulses on a mass, movement pulses which can eliminate the much lower frequency oscillations of the system are transmitted directly to mechanical components. The formerly used methods of correcting errors which, in the final analysis, were uncontrollable and which had complex error registers can therefore be avoided. An adequate torque reserve for an effective control of both position and movement as well as velocity is an important aspect of the present invention.

According to a particularly advantageous embodiment of the invention, injection pressure, injection velocity and the limits of movement are controlled or limited by a multiple or multivariable control unit by a velocity signal to the drive for a maximum approximation of a preset desired values or values actually attained during a given interval or movement (herein sometimes referred to as "target value") without exceeding them or without detrimental excesses.

Conventional control engineering assumes the components (distance and associated controller) to act linearly. Building up on the secondary velocity controller in the drive, primary position control is designed as linear feedback of the deviation of the actual value from the desired value. As expected, appropriate tests on a clamping unit with conventional velocity and position control concepts led to a dry cycle time (according to EURO-MAP 12) of about 2 seconds. Hence, the invention also seeks to come as close to the theoretically possible dry cycle time of 0.65 seconds as possible.

Within the context of the present invention, a large number of advantageous embodiments are possible. For instance, the process computer may be set up as a multiple function process control unit, preferably of the closed loop kind, in a unitary structure, in which parametric limit values, for instance of force, velocity, or distance are stored as target values, for approximating the desired or target values as closely as possible. There has been disagreement as regards many processing operations, such as injection molding, the physical parameters of which should and must be controlled, to wit:

a closed loop control of machine parameters;

an open loop control of process parameters;

a closed loop control of process parameters; or a control of product characteristics.

The disagreement has been resolved in an optimal manner by the multiple control unit of the present invention. It has been realized to be very seldom necessary in practical situations that all parameters or control variables are simultaneously subjected to as rigid a control as possible, in order to control an operation. It is often necessary rapidly to move from a point "0" to a point "B" without exceeding either a predetermined velocity or acceleration, a predetermined force or predetermined path marker. Initially, velocity or acceleration will often be the value which is critical or requires adjustment. Where the processing operation has an inherent, or generates a, counteractive force, this may develop into a critical value, so that the velocity may, for instance, have to be reduced or turned off. A closed loop control is in such a situation exercised solely in respect of a given force or a given pressure, for instance along a curve or trajectory representing the desired torque value. In a final phase, when approaching point B, the positioning control may be activated. While the inactive control parameters continue to be monitored they are ignored for purposes of any currently active control. The invention makes possible that target values are controlled or not controlled, depending upon the requirements at any given instant.

In an advantageous embodiment of the invention the multiple control unit which preferably provides for digital signal processing (in software) may be controlled or limited in a cascade-like manner. A plurality of operational phases having different target values (for instance force or velocity or distance) may easily be defined in the multiple control unit and, preferably, may be controlled or limited by the velocity signal to the drive. As regards cyclical operations in particular, for instance in welding robots or die casting or injection molding machines, all required and sometimes changing desired values for every operational cycle may thus be stored within the operations storage or memory, so that transitions from one phase to another within a given cycle may take place without any time lag.

In accordance with a further embodiment of the invention, the velocity signal input (V) or the current input (I) may be selected as the control variable to the electric drive (axle), whereby the actual velocity and the actual position may be derived from the drive. In many instances, optimum results may in this manner be obtained in a process machine by a minimum number of sensors.

A further embodiment of the invention useful for deviations in the large-signal region, i.e. in cases of large control deviations, relates to calculating the velocity adjustment signal to the drive on the basis of a parabolic or root function of the deviation between actual and desired pressure and/or the deviation between the actual and the desired movement, preferably with the largest possible amplification factor for the greatest possible acceleration of the servomotor, particularly with the following equations:

$$\sqrt{(P_{set} - P_{actual})} \times kp = \pm S_{tg}$$

$$\sqrt{(S_{set} - S_{actual})} \times ks = \pm S_{tg}$$

where $P_{set}$ is the desired injection pressure, $P_{actual}$ is the actual injection pressure, kp is a pressure amplification factor, $S_{set}$ is the desired screw position, $S_{actual}$ is the actual screw position, ks is a position amplification factor, and $S_{tg}$ is the transmitted velocity command signal.

Particularly in the large signal region the amplification factor $K_1$ or $K_2$ (FIG. 8) may be asymmetric and/or in the smallest signal region, i.e., at small signal deviations, the desired velocity signal to the drive may be calculated as a linear function of the deviation of the actual value from the desired one to obtain stability. It has been found that in the control of pressure and/or movement, especially in injection molding machines, and particularly in the large signal region, an optimum (in terms of time) process function may be established with a parabolic dependence of the velocity on the desired movement difference. That is to say, a deviation of actual from desired values in the control unit will in accordance with the invention affect the velocity control variable parabolically, rather than linearly as in conventional controls. The difference may easily be demonstrated by an oscillograph of the velocity curve. In the prior art, the transient condition is exponential in the case of an abrupt change in the desired value. According to the novel invention, the resultant time-wise velocity curve, in case of abrupt changes in the desired pressure value, will, for the most part, be linear with relatively high gradients. The desired/actual difference in the position deviation from the target is parabolically amplified as taught by the invention and is transmitted to the appropriate drive, for example as a velocity command signal. It has also been found, and can under certain marginal conditions be experimentally proven, that the same applies to the control of pressure if the desired movement signal is replaced by the desired pressure signal, and if the actual signals are similarly exchanged. The reason is that under static conditions a direct linear relationship exists between the movement difference and the corresponding pressure difference. In a 1,000 kN injection molding machine, the static system pressure rate is about 200 (bar/mm) in the forward screw region and decreases to about ⅓ of this value in the rearward region. To use the same parameters for the control of movement and pressure, the pressure difference is preferably adjusted by a scaling factor (Kp). Furthermore, to optimize the injection process, an amplification factor K1 or K2 (FIG. 9) may be configured non-symmetrically, particularly in the large signal region in order to take advantage of the higher angular deceleration under load.

A further particularly advantageous embodiment is characterized by the velocity command signal to the drive being calculated, in respect of the small signal region, as a substantially linear function of the desired/actual deviation, to achieve stability.

Preferably, the electric motor is, for example, a permanently excited servomotor, by a controlled asynchronous motor (e.g. a squirrel cage rotor) or by a controlled DC motor.

In many instances the velocity input of the electric drive may be selected for the control variable, as long as a mechanically yielding system component or resilient element is provided at the drive output. Particularly useful electric motors are motors of the servomotor kind, such as permanently energized servomotors or a vectorially controlled asynchronous motors (e.g. squirrel cage rotor), or controlled DC motor. Furthermore, AC and DC servomotors or brushless motors or very inexpensive reluctance motors, preferably switched reluctance motors, may be utilized.

In accordance with a further advantageous embodiment of the invention the process computer is designed for three or more axles or drive shafts; it is provided with an interface for connection with a machine computer by way of the data transmission system, the process operation being preferably defined in the machine computer, and the corresponding values, such as actual values, limit values etc., are readable into the operations memory (storage) of the drive intelligence of the processor as menus or programs. The data transmission system preferably is a data bus, and, more particularly, a sensor/actor bus interface or can bus. Moreover, it is particularly advantageous if a safety limit band or tolerance band is defined by the machine computer for individual values, and to store them in the processor as part of the menu or program for controlling or monitoring specific phases. Thus, when a tolerance band is exceeded, the motion of individual axles is stopped or started, as the case may be. In this manner, advantageous safety functions may be effectively controlled not only in respect of machine components, but also in respect of product quality. In many machines functional groups are defined by their operation. All axles may easily be coordinated by a single large control unit independently of a given functional group. For reasons of system surveillance, disturbance control and, possibly, standardization, two or more control units may be provided for machines having more than four or five axles, each module coordinating two or more axles. The machine computer may be constituted as a personal computer and may store all basic menus and programs, particularly all start-up and process programs, for ready recall. Thus, the total system may be set up as a decentralized open system in a modular fashion. Individual hardware components and software may thus be selectively upgraded to accommodate new developments.

The new invention provides for a number of particularly advantageous further embodiments. In one advantageous embodiment, pressure limit values or desired pressure values are additionally predetermined over time and/or movement, the actual pressure value, or a value correlative thereto, being measured and utilized to supplement the control or for the adjustment thereof. It is also proposed that the injection velocity be controlled or limited as a further target value during the injection phase, in particular during the filling phase. It is advantageous to predetermine the desired value for at least one of the target values as a constant or as a function of time or movement. The target values are preferably controlled or limited in the manner of a cascade by means of digital computers (in software). According to a further embodiment, the volume or the mass (melt) flow (m) of the plastics material flowing through the sprue nozzle is controlled or limited as a target value during the injection phase and is calculated on the basis of such detected values as pressure gradient, screw velocity and position, as well as screw diameter, material constants (from pVT diagram) etc. Furthermore, the axial displacement force acting on the injection screw may be measured and compared against a desired force curve over time and/or movement, and may be used to adjust the velocity signal. It is particularly advantageous to monitor the deviations of the actual pressure and/or force curve with respect to a predetermined velocity curve and to check or correct them using a digital controller. Position control may be superimposed on the pressure or force control, especially to avoid collisions with mechanical stroke limits.

In a further advantageous embodiment the mass flow (material or melt) (m) through the injection nozzle is superimposed or applied as a function on the pressure control by a disturbance feedforward or compensation signal, for maximum approximation of the injection pressure to the desired value even at relatively high injection velocities.

A further process according to the invention is characterized in that the sequence of operation is defined in the machine computer and the corresponding values, particularly desired values, are predetermined and transmitted via the data transmission system to a program memory of a drive intelligence which subjects the individual axles to open or closed loop control in a coordinated manner.

The invention results in a considerable number of particularly advantageous embodiments. In a preferred embodiment, the values are transmitted as complete menus of desired values or desired value trajectories for a specific operating sequence or operating cycle of the drive intelligence, the individual axles being synchronized by the drive intelligence. The position of at least one or of all of the axles, as well as their velocity and/or power consumption, is also controlled, for example according to a desired program trajectory.

The invention also relates to a control for two and, more particular, to three or more axles, with corresponding motor controls and is characterized in that a multi-axle drive, preferably as a hardware unit, has a program memory with a drive computer, in addition to the motor controls, as a functional unit, the operating sequence of a group of individual axles being adapted for open and/or closed loop control in a coordinated manner by the drive computer. The motor control provides the basic control with fixed desired value inputs, and the drive computer provides the specific operating sequences. It is a real and simultaneous cooperation for all controls for any spatial separation and, more particularly, the disadvantageous data transmission, for example via a bus, for the control functions, is omitted. The multiple axle drive is advantageously designed as an integrated control unit with integrated program memory and drive computer with preferably digital signal processing and is provided with one or more position controls as well as an interpolator for the multi-axled synchronization of movement and/or trajectories. The multiple axle drive is advantageously designed to be connected via data bus, preferably a sensor/actor bus interface or can bus, to a primary machine computer memory. An electrically driven injection molding machine can accordingly have one or, for example, two multiple axle drives, the multiple axle drive or drives being connectable to a data bus, preferably a sensor/actor bus interface to primary computer means or the injection molding machine. The data bus is no longer overloaded with control signals which have to be updated in high frequency. The primary computer means is provided with storage means for the storage of all value trajectories and programs, for example also for the start, enable and sequence control and the control of the other machine functions.

A further advantage of the novel invention is its suitability for powering in machines, in particular robots, at least some, and preferably all, of the operating axles with a rotor controllable by a drive intelligence.

The invention also relates to an electrically driven injection molding machine provided with an electric drive, especially for the injection screw, which may be driven for axial displacement by a motor and mechanical transmission, and which is characterized by the drive being controllable by electronic controls via a velocity input (and a motor position feedback or an input for the position or a position is profile) to which a digital computer is allocated for cascade-like control or limitation of target values, in particular of the injection molding process.

According to a preferred embodiment, at least one further axle of the injection molding machine, such as, for example, the axles or drive shafts of the clamp unit and/or of the ejector and/or of the core pull or pulls and/or of the carriage unit displacement is controlled or limited. The injection molding machine advantageously has allocated to it a computer and a memory for desired modulation, for the change of position of a resultant magnetic field and a corresponding control unit for the drive which is preferably designed as a synchronous motor. It has been found that in a great many applications, the above described open and closed loop control concepts may be applied individually or in particular combinations to other parts of the injection molding machine. In particular, it is proposed that at least one sensor be arranged on the displacement mechanics of the injection axle and/or on the closure axle and/or the ejector axle and/or on the carriage unit axle for determining the pressure for the injection molding and/or the force and/or the current of the respective drive motor. It is also proposed that at least one force and/or movement sensor be arranged in the region of the moving axles, such as, for example, the injection axle, the open loop controller preferably being allocated at least one closed loop controller for the superimposition of a pressure and/or force and/or movement control which are designed to be connected automatically at least when they reach predetermined limit vales. However, it is particularly advantageous if all basic data in the form of menus for individual products are stored in a memory which is separate from the machine control, for example in the form of a PC, and are transmitted to the machine control as basic control data or as an entire menu. The injection molding machine preferably has control electronics, the respective servomotor being controllable by the control electronics via a velocity input and a motor position feedback, or an input for the position or a position profile. The drive preferably has an electric servomotor (a brushless servomotor, for example of the "electronically commutated brushless motor" type, trademark "Fastact") or a controlled asynchronous 'motor (for example cage rotor) or a controlled direct current motor (DC-motor).

It is also possible to adapt the illustrated solutions according to the invention to die casting machines, provided that the system with the incompressible metal melt is adjusted, by application of a genuinely flexible or resilient element, for example a compression spring between the drive and the moving injection elements, to analog system behavior as with injection molding machines.

BRIEF DESCRIPTION OF THE DRAWINGS

Preferred embodiments of the invention will now be described in greater detail with reference to the accompanying drawings, in which.

DETAILED DESCRIPTION OF THE PREFERRED EMBODIMENTS

Figure 1:
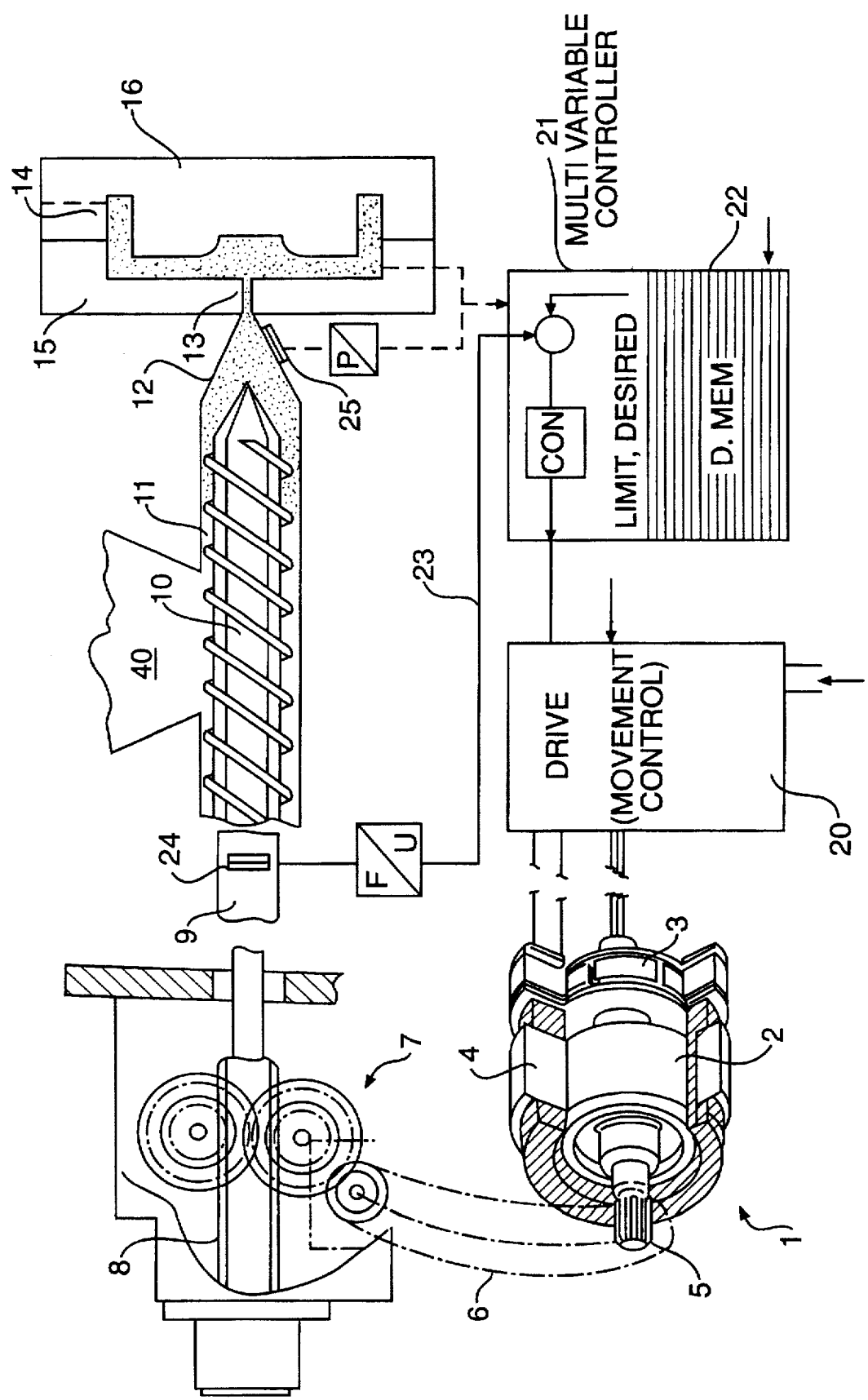
FIG. 1 is a schematic presentation, partially in section, of the main functional elements of an injection molding machine in accordance with the invention.
Figure 2:
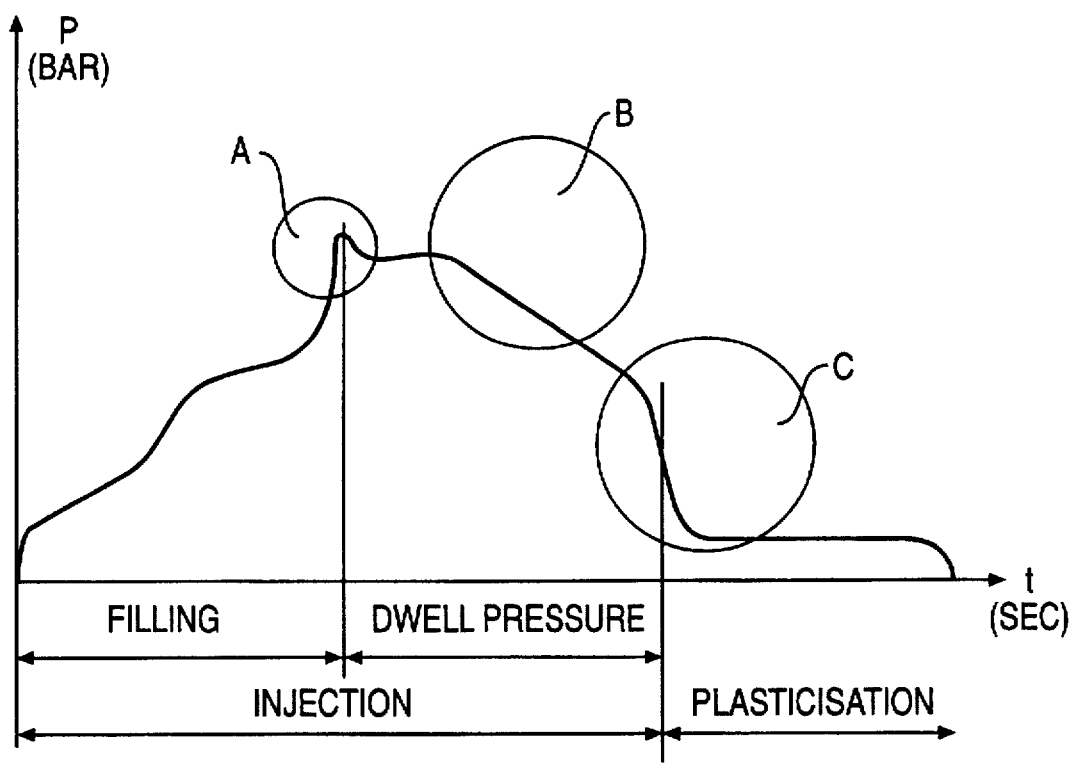
FIG. 2 is a simplified rendition of the basic pressure curve as a function of time.
Figure 2A:
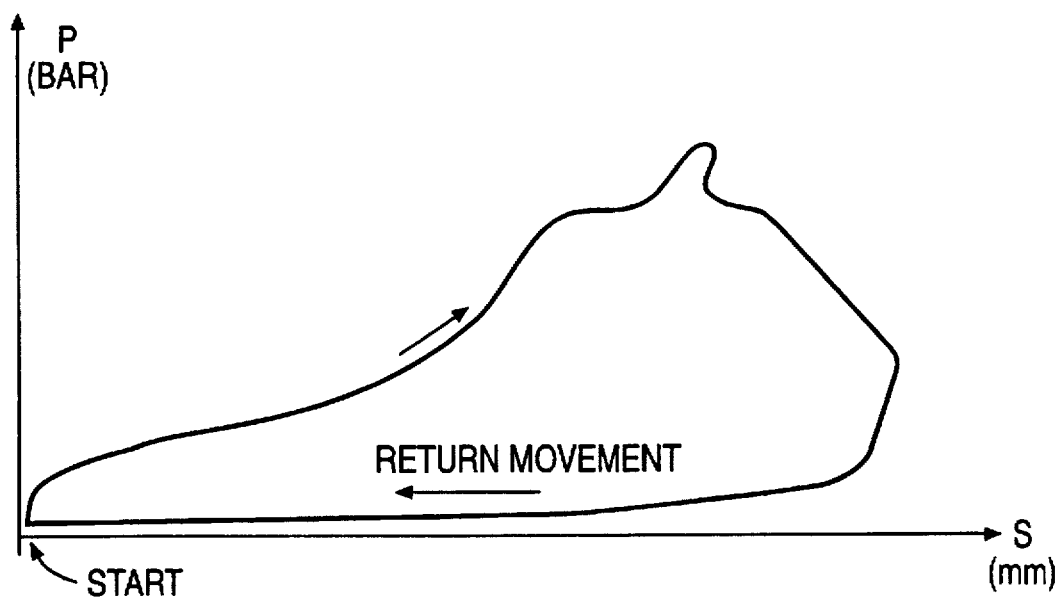
FIG. 2a is a corresponding simplified view of the pressure as a function of the screw position over an entire injection cycle.

With reference to FIG. 1, there are schematically shown the major components of an extruder or injection molding machine, including a drive motor 1 provided with a rotor 2 with permanent magnets and a position sensor 3. A stator 4 is provided with a plurality of windings, usually three, as well as an inverter. A gear or pinion of a transmission 7 is driven by an output pinion 5 keyed to a drive shaft of the rotor 2 and a drive train 6 which while depicted as a toothed belt should preferably by a geared drive train. The transmission 7 converts the rotational movement of the motor drive into a linear movement by its meshing engagement with a toothed rack 8. The toothed rack 8 is connected to a screw shaft 9 so that the rotational movement of the rotor 2 is directly transmitted as a linear movement to a plasticizing screw 10 to execute the movement required by an injection molding operation. As illustrated, the plasticizing screw 10 is shown to be positioned nearly fully forward in an injection cylinder 11 which corresponds roughly to the end of a filling phase. A considerable quantity of injection material 12 is still seen to be within the injection cylinder 11 to be pressed through an injection nozzle 13 into the cavity 14 in a mold comprising two sections 15 and 16. The described operation is executed by a drive 20 by monitoring changes in the position of the magnetic field as a function of the displacement of the rotor 2 or by an analogous control of the movement of the rotor 2 by a drive 20. All necessary control signals at the drive 20 are processed and supplied by an electronic control unit 21. For this purpose, the electronic control 21 is provided with a data or menu memory 22 from which a menu of the desired velocity and pressure values predetermined for the injection molding operation or extrusion process modulates the manner and sequence of movement, thereby producing the desired velocity and pressure profile. The electronic control 21 is preferably designed as a multivariable controller. An entire injection molding process can be controlled by the described basic functions. For new, unused molds or materials on the one hand, and as a safety measure during changes in the quality of the molding materials on the other hand, it is advantageous continuously to monitor or record additional process parameters by appropriate sensors. Thus, it is very advantageous to monitor the axial force in the screw shaft 9 during the entire injection process via a force sensor 24 and to transmit it via a signal line 23, which may be a bus transmission system, to the electronic control. In this manner, an adjustment signal may immediately be released by the movement control if limit values are exceeded. A further possibility is direct pressure detection via a pressure sensor 25, this signal also being use-ful for movement control in the electronic control 21. FIG. 2 is representative of a pressure profile over an entire injection cycle. The critical transitions are specially marked. "A" denotes the transition from the filling phase to the dwell or holding pressure phase. "B" marks the transition from the dwell pressure phase to the plasticization phase, and "C" marks the actual transition to plasticization. FIG. 2a shows the pressure/movement profiles of the linear movement of the plasticizing screw 10. The movement begins at the "start" position and terminates at the same "start" in—readiness of a subsequent cycle.

Figure 3:
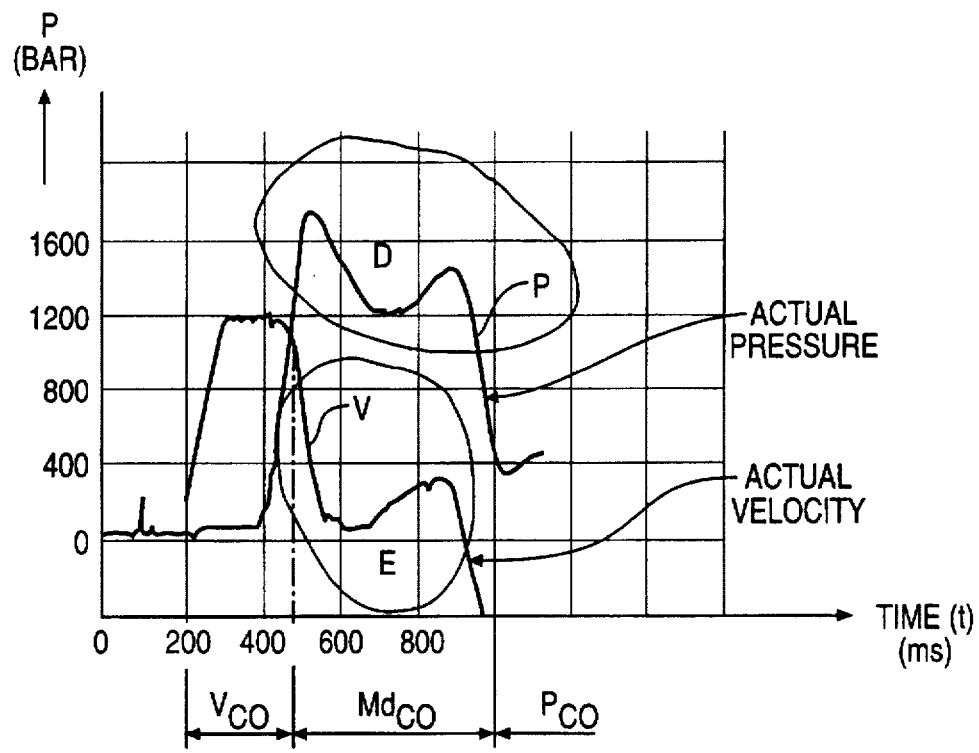
FIG. 3 shows the actual pressure or velocity curve according to the prior art.
Figure 3A:
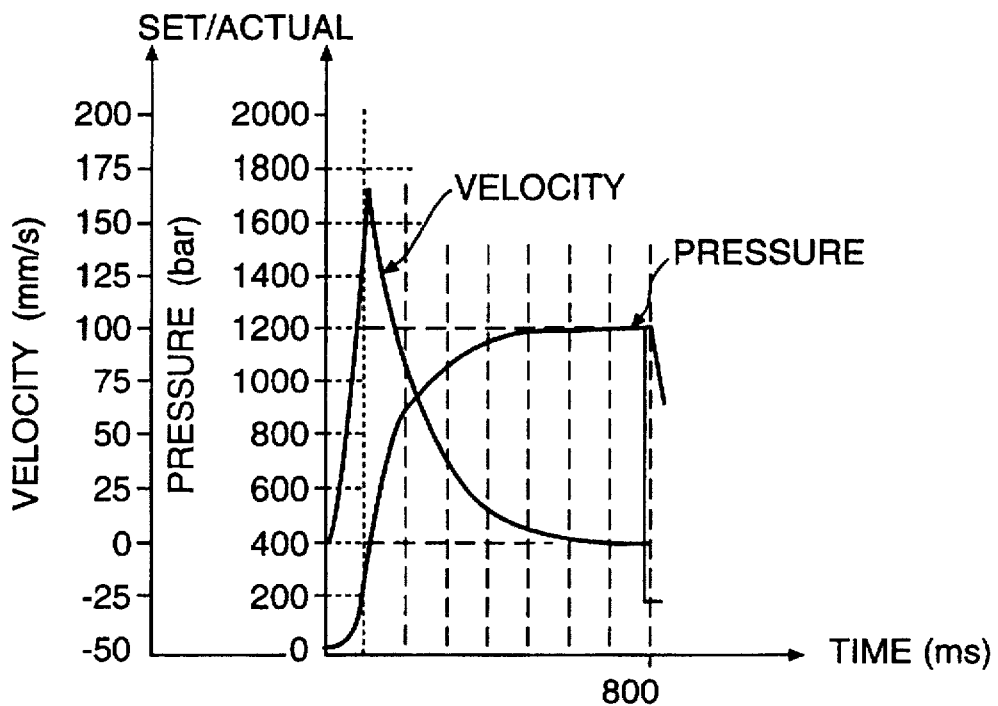
FIG. 3a shows the response to a desired pressure value with a linear pressure controller.

FIG. 3 shows the oscillating behavior typical of prior art apparatus. In the prior art, the first or filling phase is velocity controlled (Vco) and the second or holding (dwell) pressure phase (Mdco) is pressure controlled, or, in the case of conventionally driven injection molding machines, torque controlled. The essentially uncritical filling phase yields good results by straight velocity control. By comparison, a very disadvantageous oscillating movement with a half wavelength of about 200 milliseconds develops in the dwell pressure region, as marked by the circle D in the pressure curve, and E in the velocity curve. FIG. 3a shows typical measured pressure and velocity curves. Derived from a linear control, a very disadvantageous exponential transient condition results at an abrupt change of desired values.

Figure 4:
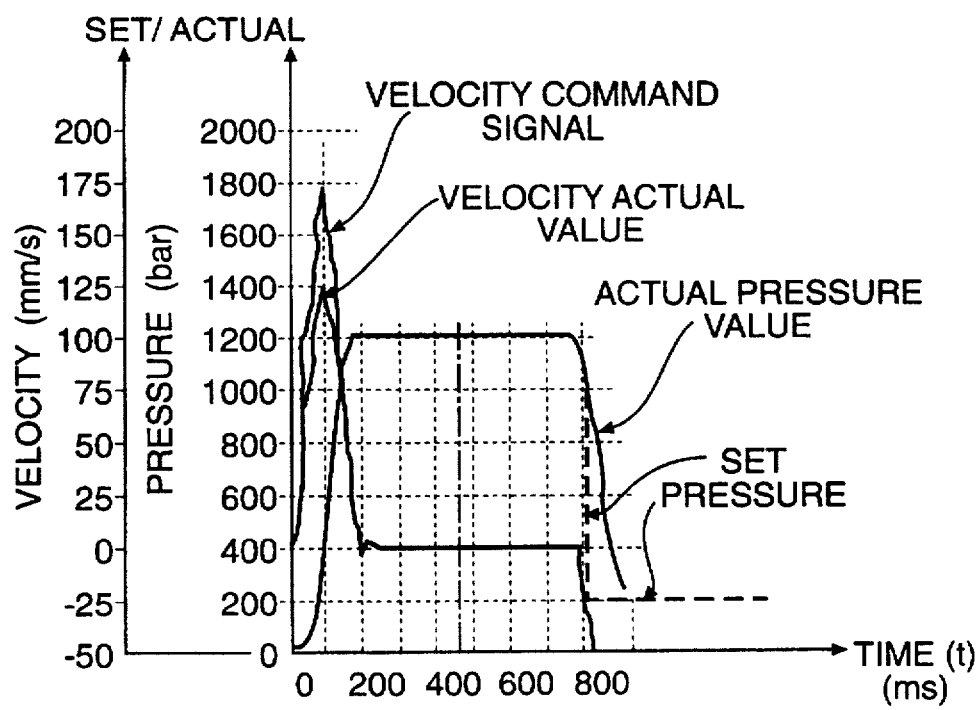
FIG. 4 shows the actual pressure or velocity curve measured on an injection molding machine equipped with the features of the invention.
Figure 4A:
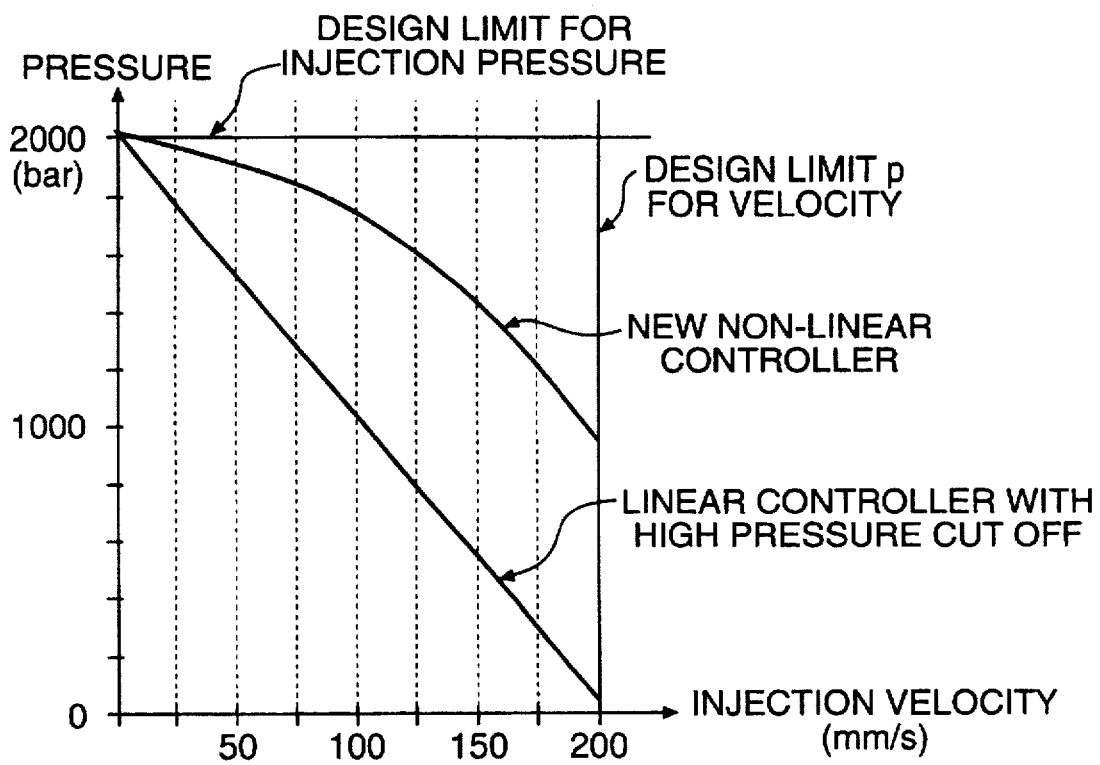
FIG. 4a shows a comparison between the static pressure override characteristic with linear and non-linear controller.

FIG. 4, by comparison, shows results obtained with an apparatus provided with the features of the invention. The actual value traces a predetermined desired value in an almost ideal manner and produces a substantially linear velocity curve and very abrupt transitions from one phase into the next. There is no oscillation movement at all. Thus, not only could the oscillation of about 2.5 Hertz inherent in the system be demonstrated, but also the major disadvantage of the prior art. In the prior art, it was necessary by an abundant open and closed loop control to attempt suppressing unacceptable interferences in the best known way. FIG. 4 also shows clearly that by controlling the actual movement the otherwise present oscillating movement is suppressed and high stability is attained as regards both pressure and velocity profiles. All experiments based on the novel invention have demonstrated that by controlling the movement, the oscillations are avoided, and an ideal curve corresponding to the target values is obtained. An almost ideal linear curve of the actual velocity is obtained in response to a pressure change. FIG. 4a shows a comparison between static pressure and movement characteristic and shows that with the novel linear control it is possible to run much closer to the design limits.

Figure 5:
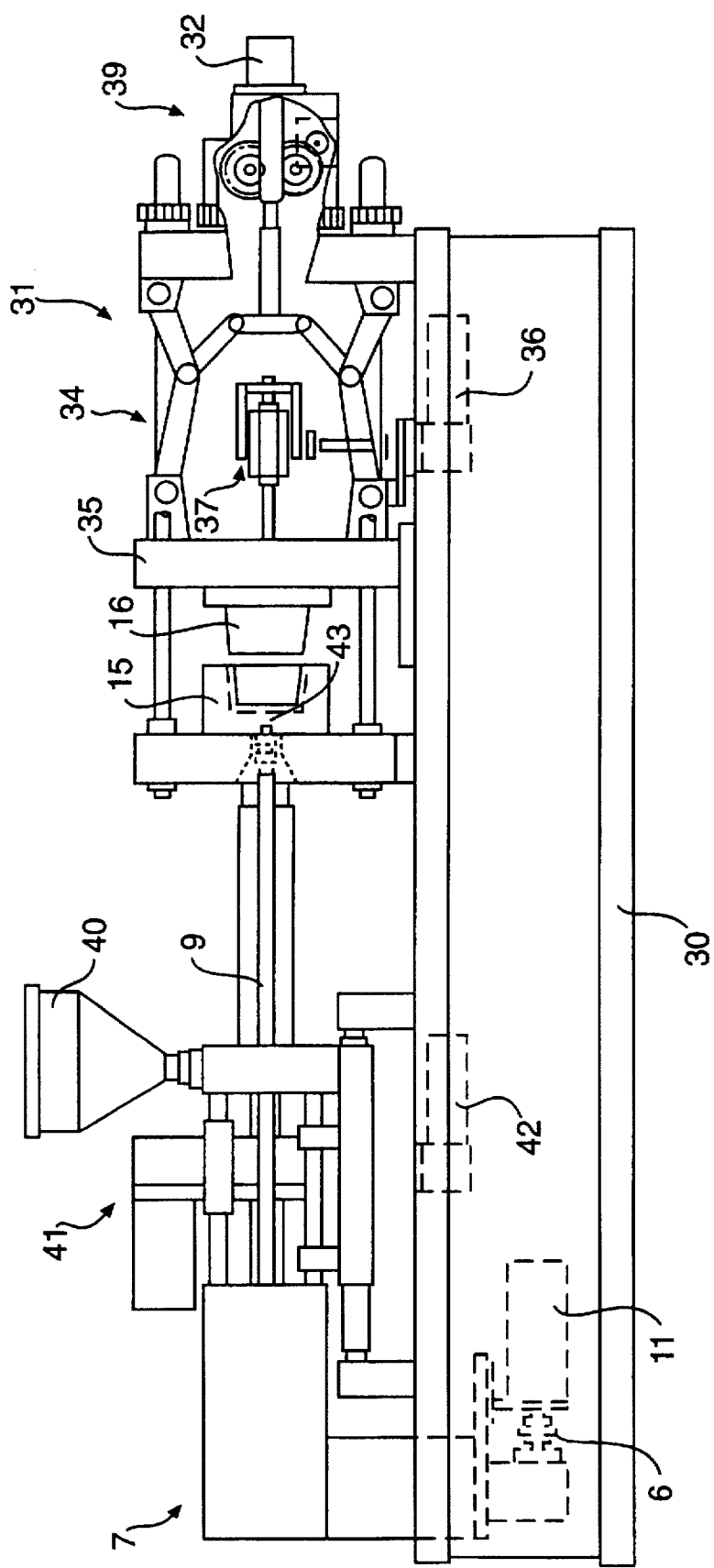
FIG. 5 is a side elevational view of an injection molding machine in accordance with the invention.

FIG. 5 depicts a complete injection molding machine mounted on a machine support frame 30 together with a mold closing arrangement 31 which moves a movable base plate 35 carrying a mold section 16 into and out of closing relationship with a stationary mold 15 before and after each injection cycle by a rotary drive motor 32 and a transmission 39 connected to a double hinged toggle lever arrangement 34. An additional drive motor 36 is provided to actuate an ejector 37. The plastics raw material is supplied into a screw barrel from a feed hopper 40. The rotational movement of the plasticizing screw 9 is generated by a drive motor 41 provided with an appropriate transmission (not shown in detail). A further axle or drive shaft 42 is provided for moving the carriage unit. The injection or sprue nozzle is shown at numeral 43.

Figure 6:
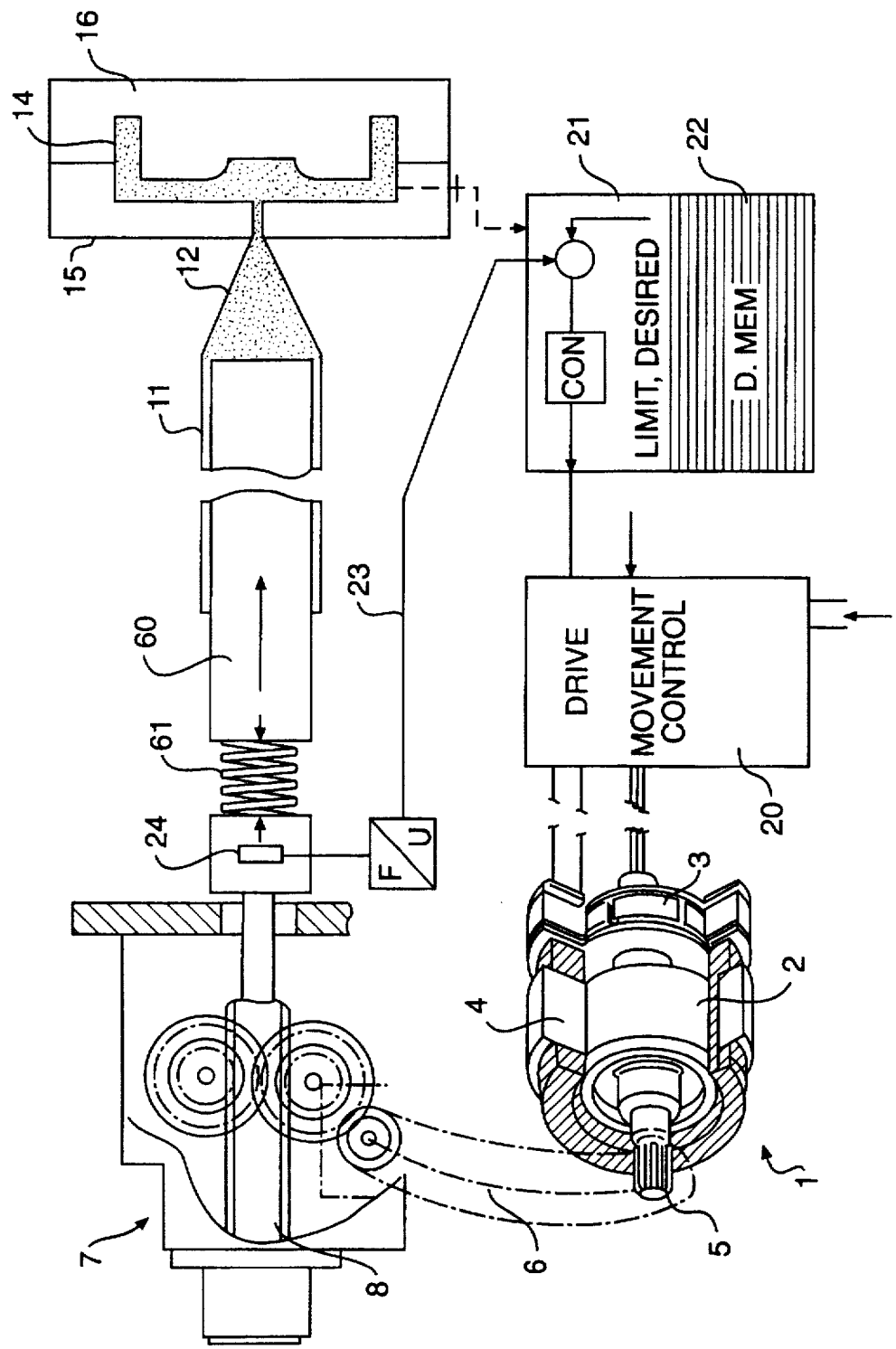
FIG. 6 is a schematic representation of an application of the invention in a diecasting machine.

FIG. 6 shows a structure similar to that of FIG. 1. Identical features are designated by identical reference numerals. The machine depicted in FIG. 6 is a specialized injection molding machine, to wit a die casting machine. Metallic materials such as aluminum and the like may be processed by such a die casting machine. In contrast to the plastics material used in injection molding machines, metal is practically not compressible, even in its molten or liquefied state. It has been found that but for the specific values in particular menus, the invention may also be advantageously practiced in the context of die casting machines provided a compression spring as shown at 61 for simulating the resilient behavior of plastic melt is structurally integrated between the transmission 7 and an injection molding piston 60.

Figure 7:
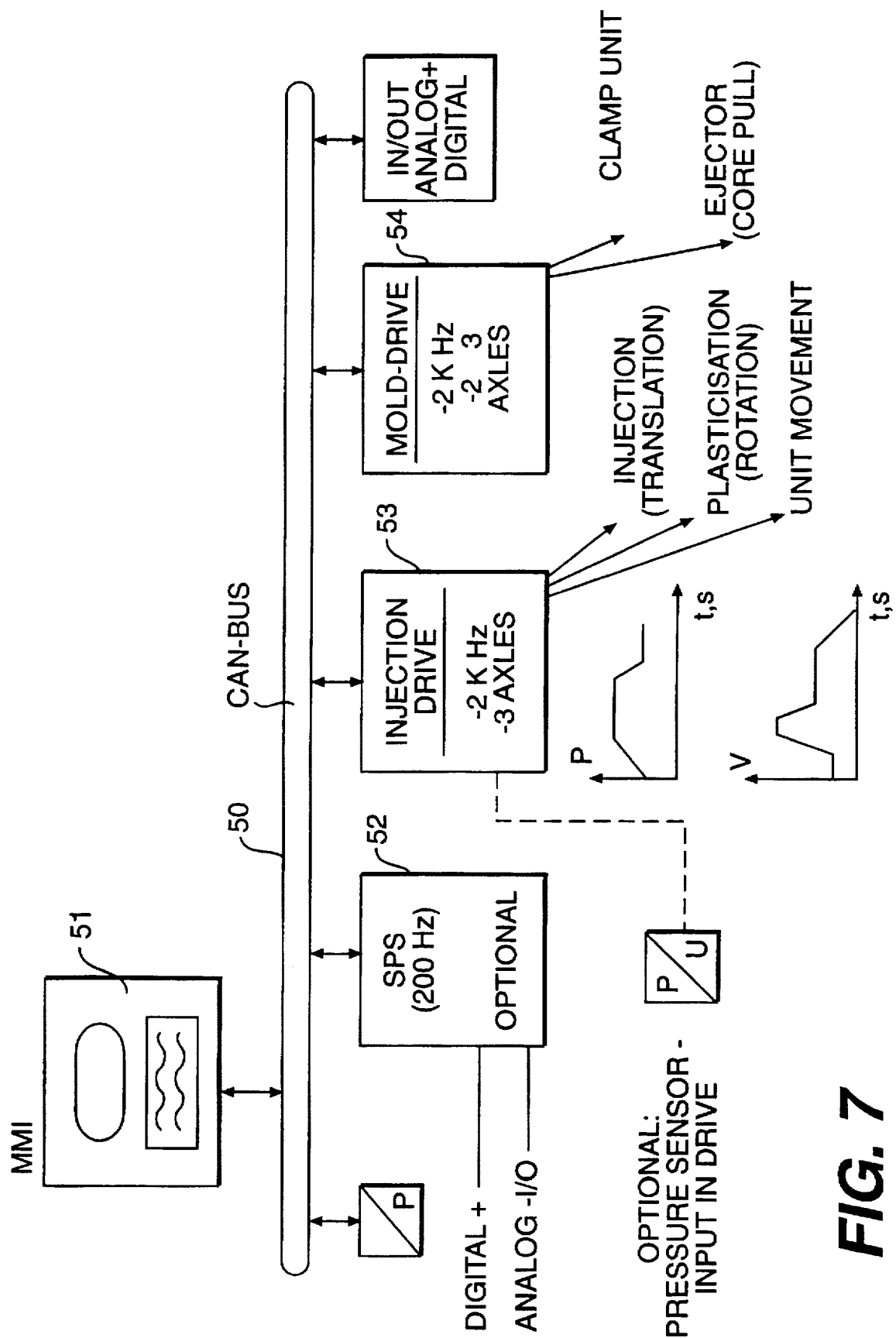
FIG. 7 is a schematic diagram depicting the control in accordance with the invention applied to a complete machine.

FIG. 7 shows an advantageous design of an overall control in which communication is carried out via a field bus 50. All programs can be stored in a computer memory, for example in a personal computer 51, and can be transcribed in a mold-specific or material-specific manner for the respective operating instruction or the production of a specific number of identical parts as menus for a stored program controller (SPS) 52, for example. All other sensor signals may optionally be coordinated from there via the field bus 50 or all operating signals may be transmitted. In FIG. 7, two multiple axle drives 53, 54 are combined as a hardware unit. The injection drive 53 coordinates the three axles for injection (translation), plasticization (rotation) and injection aggregate movements. Two or three axles are shown in the mold drive 54: the clamping unit axle and the ejector (or core pull) axle. Other combinations are also possible.

Figure 8:
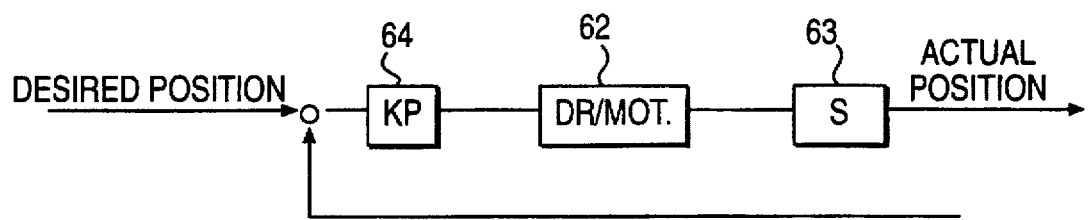
FIG. 8 shows conventional position control according to the prior art.
Figure 8A:
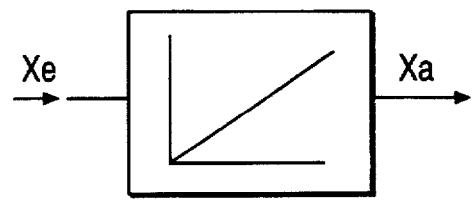
FIG. 8a shows the linear function, associated with FIG. 8.

FIG. 8 shows a conventional position controller having the linear control function depicted in FIG. 8a, wherein 64 represents a conventional (proportional) control, 62 represents a secondary drive/motor velocity control, and 63 is a mechanical integrator for integrating the motor rpm into an actual value.

Conventional control engineering assumes the interaction between components (extent of movement and associated control) to be a linear one. In such a system, proceeding from the secondary velocity control in the drive, the primary position control is designed for linear feedback of any deviation of a desired value from an actual one.

Figure 9:
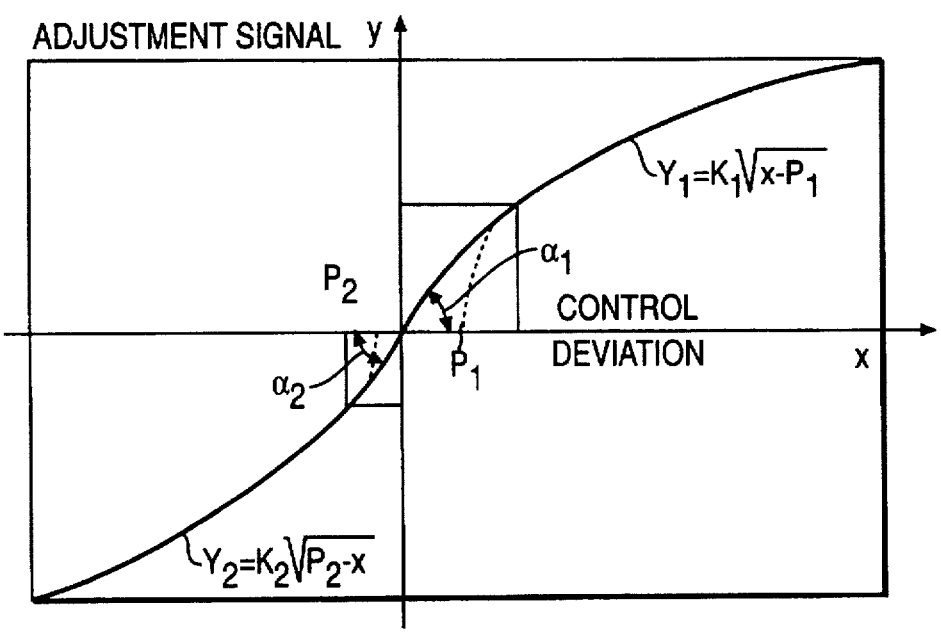
FIG. 9 shows an example of the invention with an optimised linear/parabolic function.

FIG. 9 shows the functional characteristic of a linear and parabolic controls. To prevent the high amplification in the small signal region from leading to instabilities, the parabola has been replaced by a conventional linear function in the region close to the desired position. It has been found that a (time) optimum movement function can be obtained when the position in the large signal region is controlled with a parabolic dependency of the velocity on the difference from the desired position. That is to say, in the novel control, deviations of the actual from the desired values affect the velocity adjustment variable primarily in a parabolic manner, rather than linearly as in conventional controls.

Figure 10:
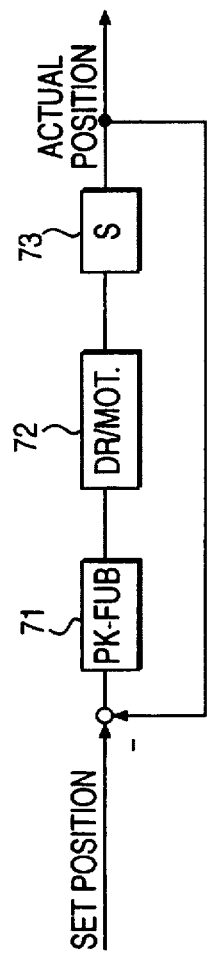
FIGS. 10, 10a and 10b show various aspects of the invention with linear/parabolic controller.

FIG. 10 depicts an improved position control as provided by the invention, in which 71 represents the position control functional component (PK-FUB), 72 represents a secondary drive/motor velocity controller, and 73 represents a mechanical integrator for integrating the motor rpm into an actual position value.

Figure 10A:
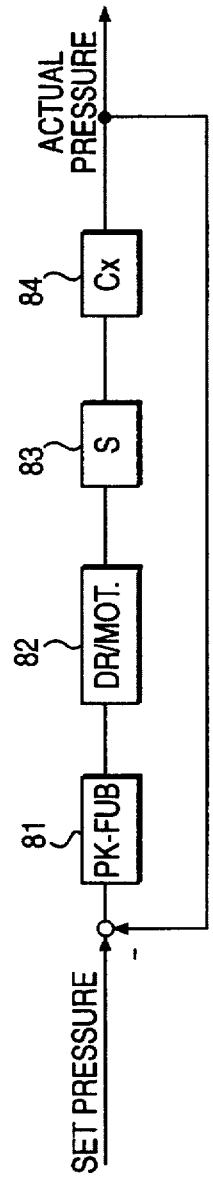

Aside from the time-optimized or acceleration-optimized approach to the target, the functional control 71 also contains the preset maximum acceleration and deceleration values as well as the value of the permissible and preset speed of movement which must not be exceeded. FIG. 10a shows an optimized pressure control in which 81 is a position control functional component, 82 is a secondary drive/motor velocity controller, 83 is a mechanical integrator for integrating the motor rpm into an actual position value, and 84 represents a static system pressure amplification (bar/m).

The invention has shown, and under certain boundary conditions it can now be mathematically proven, that pressure control functions similarly if the desired movement signal is replaced by the desired pressure signal, and if the actual value signals are similarly exchanged. The reason for this is that in a static condition a direct linear relationship exists between movement difference and corresponding pressure difference. In an injection molding machine of 1,000 kN, the static system pressure amplification is about 200 bar/mm in the forward zone of the screw and decreases to about ⅓ of this value in the trailing zone. When using the same parameters for movement and pressure controls, the pressure difference has to be adjusted by a scaling factor (Kp).

Figure 10B:
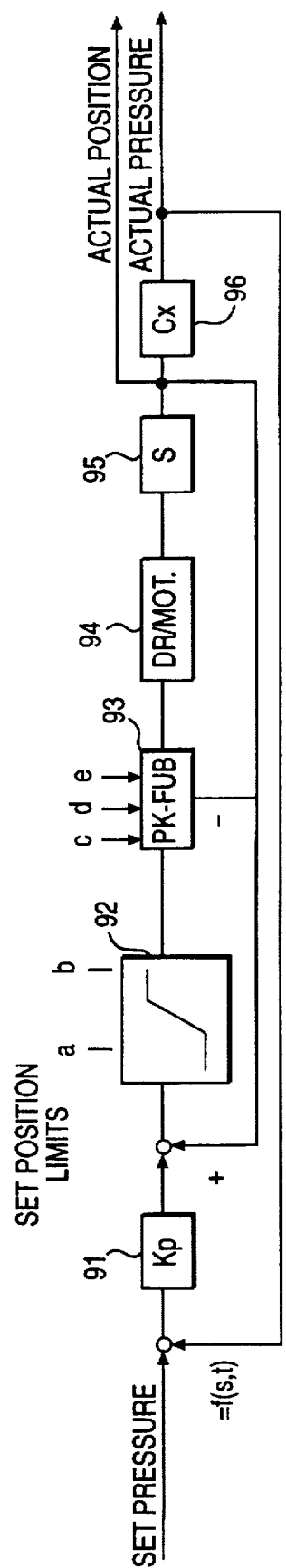

In general, in an injection operation both pressure and velocity are predetermined. In the first phase, priority is often given to the control of velocity and subsequently control is shifted to the selection of an appropriate pressure. Furthermore, the software of the injection control has to ensure that the terminal positions are not overtraveled, that is to say they should in normal circumstances not be touched. Never should movement to the mechanical stops take place at a high velocity. The injection control, therefore, has to meet the following requirements:

Control of the (maximum) injection velocity=f (s,t);

Control of the (maximum) injection pressure=f (s,t);

Control of the (minimum/maximum) extent of movement→ typical of the machine; and Control of the (maximum) acceleration and deceleration;

FIG. 10b shows an injection control optimized to an even higher degree, in which 91 represents the adaptation of pressure control amplification; 92 indicates the extreme position (overrun); 93 represents the position control function component; 94 is a secondary drive/motor velocity control with secondary current control; 95 is a mechanical integrator for integrating the motor speed into an actual position value; 96 represents a static system pressure amplification (bar/m); "a" is the limit of maximum movement; "b" is the limit of minimum movement; "c" is the desired acceleration; "d" is the desired deceleration; and "e" is the desired injection velocity=f (s,t).

For specific tasks, the optimized injection control may be improved further. Thus, particularly in the large signal region, the amplification factors Kp or Kz may be configured non-symmetrically as a further optimization for the utilization of the higher angular deceleration under load.

Furthermore, a (partial) quadratic interference value application of the actual velocity or, preferably, of the mass flow from the feed nozzle 43 at a desired pressure can also be selected for further optimizing the pressure/velocity characteristic (pressure cutoff characteristic). Moreover, a nonlinear connection between motor angle and screw position at a given desired value and during control parameter determination must generally be taken into consideration.

According to a further advantageous embodiment, the mass flow rate (m) through the injection nozzle can be applied to compensate or supplement the pressure control for maximum approximation of the injection pressure to the desired value, even at elevated rates of injection. For example, the desired pressure value may be compensated as follows:

$$K1 \times V1 - K2 \times P2,$$

wherein K1, K2 denote dependent constants, V=screw feed velocity; and P=injection pressure gradient.

Figure 11:
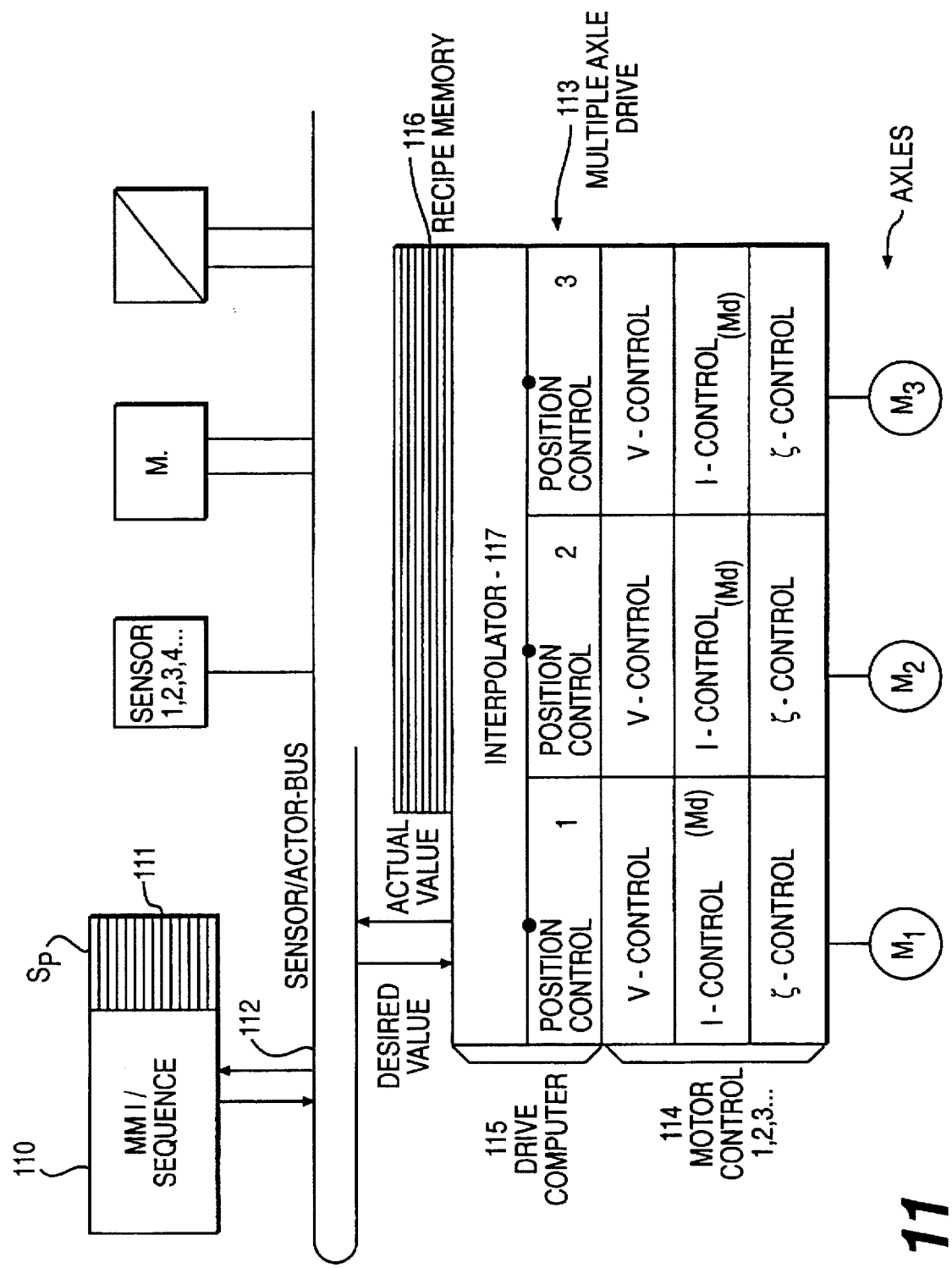
FIG. 11 is a simplified schematic view of a controller for three axles.

FIG. 11 is a basic diagram of an advantageous embodiment and depicts the main functional elements of a multiple axle drive. FIG. 11 is also a detail of FIG. 7. A machine computer 110 with a computer data memory 111 is connected via a bus or a sensor/actor bus 112 to a multiple or multivariable drive or multiple axle drive 113 consisting of at least three controls 114 (114.1; 114.2; 114.3 etc.), a drive computer 115 provided with a menu memory 116. The drive computer 115 consists of an interpolator 117 and three position controls 117.1; 117.2; 117.3 which form a functional unit ensuring the best possible and fastest possible coordination of all the position controls. Each control 114 is provided with its own velocity control (V-control), a current control (I-control) which controls the torque, as well as a field control ($\phi$-control) and is connected in each case to an axle or the motor M1, M2 or M3 corresponding thereto. All necessary signal or control connections of the machine such as sensors, auxiliary motors, etc. may also be connected to the sensor/actor bus 112, in the manner shown in FIG. 7. However, direct high velocity processing for all control tasks takes place directly in the multiple drive 113 on the basis of desired value limit values or a corresponding menu which is transmitted by the computer data memory 111 for each specific operation.

Figure 12:
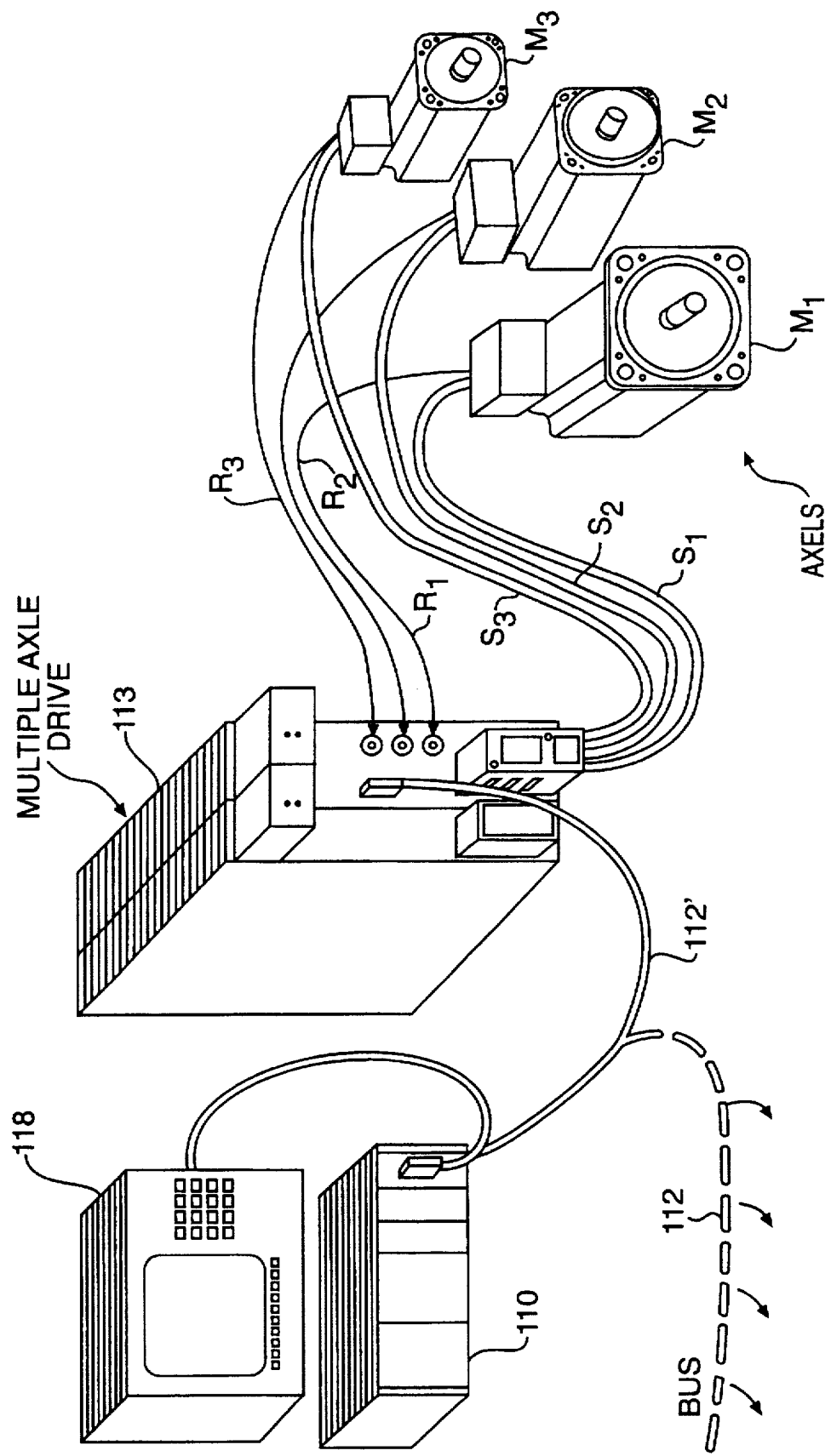
FIG. 12 is a perspective simplified view of the basic elements for an entire machine.

FIG. 12 is a simplified view of a multiple or multivariable drive or multiple axle drive in accordance with the invention, provided with hardware to accommodate three axles (M1, M2, M3). The core is the multiple axis drive 113 which in the embodiment shown is designed for the simultaneously coordinated open and closed loop control of three axles or three motors (M1, M2, M3). Data can be transmitted via a direct line 112', or via a data bus 112 as in FIGS. 7 or 11, depending on the degree of sophistication or complexity of the entire control. Visual data is provided by a master device or monitor 118 of the machine control or machine computer 110. Basic components on which the new solution is based are the control connections (S1, S2, S3) with the respective motors M1, M2, M3 as well as the feedback connections R1, R2, R3 by means of which the $\phi$-controlled or the actual position values of each axle are fed back, or by means of which the corresponding internal control takes place. The multiple axle drive is an open/closed loop motor control for several axles.

In summary, the solutions of the invention allow to devise stable machine controls of simple and clear design proceeding from the actual control and monitoring of a real operational process, wherein basic parameters such as force, velocity and movement controlled in a manner not heretofore possible by the novel multivariable control in accordance with the invention;

and wherein directly cooperating axle functions are compiled into an open and closed loop control module for a plurality of axles.

The term multivariable control as used herein is inlo tended to connote, without being thus limited, the control of a plurality of target values for an axle or drive. The multivariable control is assigned a spatial envelope comprising the aforementioned three basic parameters as well as a menu for each specific operating instruction. (By comparison, a conventional control is characterized by strictly coupled desired and actual values, by being always active and by seeking conformity between those two values.) The multivariable control 29 of the invention differs from a conventional control in certain fundamental aspects. Since at least two or three desired values or their corresponding limit values are predetermined as target values, only one of these values is in normal circumstances controlled or limited, as the case may be, while at the same time control over the remaining variables is dormant or inactive. For example, once a maximum predetermined pressure (for example 2,000 bar) has been established, the corresponding pressure control is activated while the other two controls assume their dormant state. The same applies, mutatis mutandis, in respect of all the other parameters. In this manner, all basic parameters (pressure, velocity and movement) of the respective electric drives can be optimized. In the case of injection screw control, it is a velocity signal for the axial movement of the injection screw which is selected as the command signal for all three parameters.

Accordingly, having regard to the three main operational phases, there is provided, firstly, a process for the extrusion molding of articles by means of an injection molding machine, in which a) the injection screw is moved axially by means of an electric motor and an associated transmission and b) process parameters are subjected to closed or open loop controls wherein c) during such open or closed loop control, including limits on the pressure of the melt, a velocity signal is selected as the command variable for the axial displacement of the injection screw.

Secondly, in a further aspect of the invention, there is provided a method of extrusion molding of articles by an injection molding machine in which a) an injection screw is axially moved by an electric motor and a transmission connected thereto, b) processed parameters are subjected to open or closed loop controls wherein c) during such open or closed loop control a velocity signal is selected as the command signal for limiting the axial displacement of the injection screw.

Thirdly, in a further aspect, based on the first and second aspects, an axial displacement velocity signal is selected as the closed or open loop control signal for controlling the axial velocity, including the axial movement of the injection screw.

Furthermore and fourthly, from the group of process parameters including the pressure exerted on the injection molding material, the axial velocity of the injection screw and the extent of movement or stroke of the injection screw, the one parameter which has reached a predetermined limit values or band widths is subjected to the closed or open loop control. The limit values or bandwidths can be predetermined as functions of time and/or movement. Similarly, the same principle may be adopted, at least in part, during closure of the mold.

For example, in the machine as an integral unit, the injection process as well as mold closure, can be controlled with a novel unitary open or closed loop control. This simplifies the control of the entire processing sequence and, more particularly, allows extremely great flexibility, yielding top quality results. Also, the particularly critical phases or parts of the process can, within a very short cycle time, be performed with a constancy and reproducibility of the production sequence heretofore not attained. The combination of multiple variable control and multiple axle drive is also particularly advantageous.

According to a further embodiment, it is possible to integrate the velocity adjustment signal and to transmit it as a movement adjustment signal (or, optionally, in the form of position signals) to the control electronics (drive with integrated velocity and position control).

Figure 13:
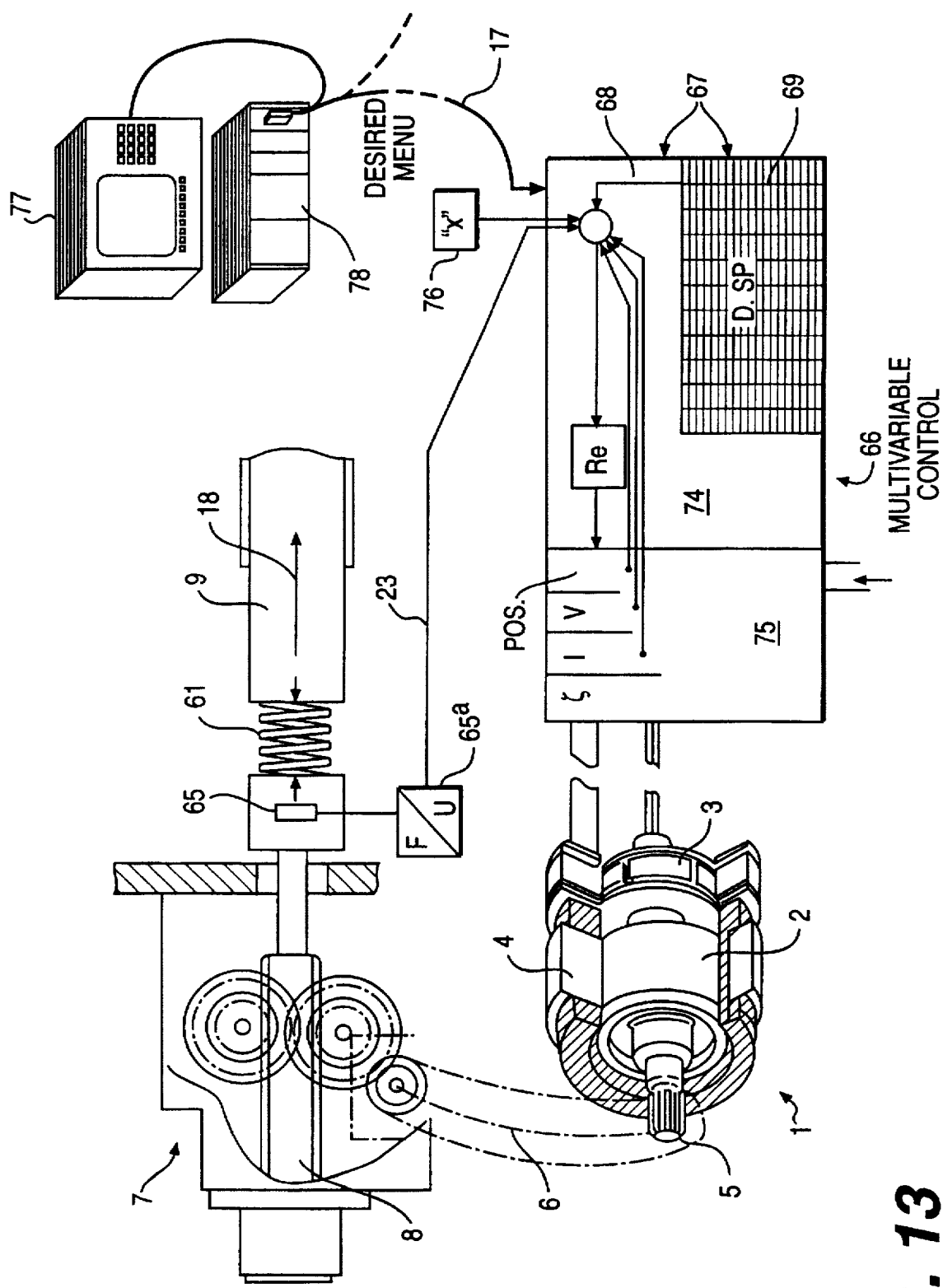
FIG. 13 is a schematic presentation of the essential functional elements of a multiple control unit as applied to an electrically driven injection molding machine.

Turning now to FIG. 13, there is shown an operational machine system similar to the diecasting apparatus of FIG. 6. A drive motor 1 is provided with a rotor 2 having permanent magnets as well as a position sensor 3. The stator 4 is provided with a plurality, usually three or for, windings (pole pairs) as well as an inverter. By way of a drive pinion 5 which is affixed to a drive shaft of the rotor 2 a transmission 7 is driven by a toothed belt or, preferably but not shown, a gear train. The transmission 7 converts the rotary movement of the motor drive into a linear movement which is directly applied to a toothed rack 8. The toothed rack 8 is connected to a shaft 9, so that the rotary movement of the rotor 2 is directly converted into linear movement as indicated by arrow 18 to execute the movement required for the operation. Rather than by means of the transmission 6 shown, the rotor 2 shaft may be directly connected with the toothed rack 8 or shaft 9. For purposes of converting the rotary movement into a linear one, there may be provided an intermediate ball spindle (not shown). Intermediate the toothed rack 8 and the shaft 9 there is provided a helical spring 61. The spring 61 may be a compression spring, or it may be representative of a corresponding elasticity of the mechanical system or of the elasticity of the article to be produced. In the case of an injection molding machine, the molten plastic mass provides such an elastic mass. A force or pressure bumper or absorber 65 detects the instantaneous force or pressure and transmits it by means of a sensor or transducer 65a and a signal line 23 to a multivariable control unit or controller 66. The multivariable control unit 66 comprises a control unit 67 comprising a drive intelligence 68 as well as a menu storage 69. The drive intelligence 68 is directly connected to a process or drive computer 70 which controls the movement of the rotor 2 by means of an interpolator 74 as well as a control 75. 76 and "X" represent one or more function parameters as actual values received from the machine, its operation or product. According to given requirements these parameters have to be controlled as control or limit functions. The menus or programs are read into the drive intelligence 68 by means of a command module 77 or a machine computer 78.

Figure 14:
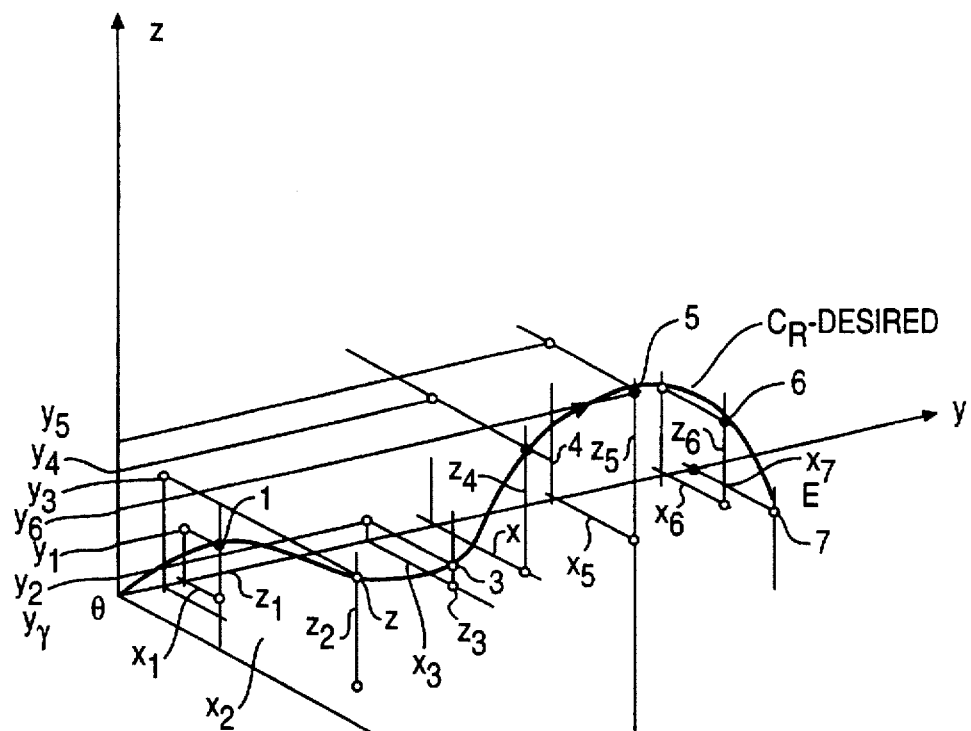
FIG. 14 is a diagram depicting spatial movement from a point O to a point E.

FIG. 14 represents a three-dimensional curve along the X, Y, Z coordinates for the desired CR value. A basic function is to go from the initial position 0 precisely along the curve $CR_{desired}$ to point E at a predetermined velocity, i.e. to simulate the movement in time of the gripper of a robot or the hook of a crane. Thus, FIG. 14 depicts an idealized curve, whereby in sufficiently short steps or intervals, preferable in the range of milliseconds, movement commands must be issued for each coordinate or each axis M1, M2, M3.

Figure 15:
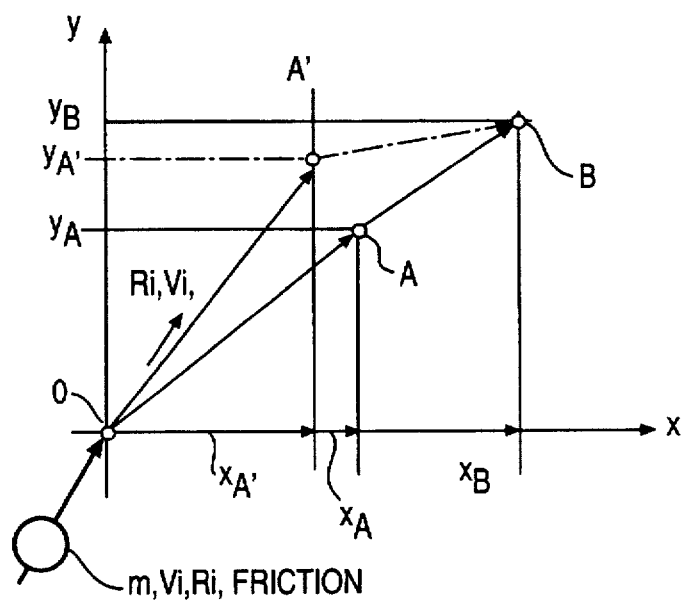
FIG. 15 is a diagram illustration movement in a plane from point 0 to points A and B.

FIG. 15 depicts two partial steps from 0 to A and from A to B in a plane X - Y. In FIG. 15 different non-logical parameters such as friction (Ri) and an oscillating mass (M) are assumed to be present. At point O the mass is moving in the direction Ri at a predetermined velocity Vi and does not arrive at point A but at point A'. Point A' is, however, outside of the desired value curve 0-A-B, so that at A' a corrective movement command must be calculated and transmitted for both directions X and Y.

Figure 16:
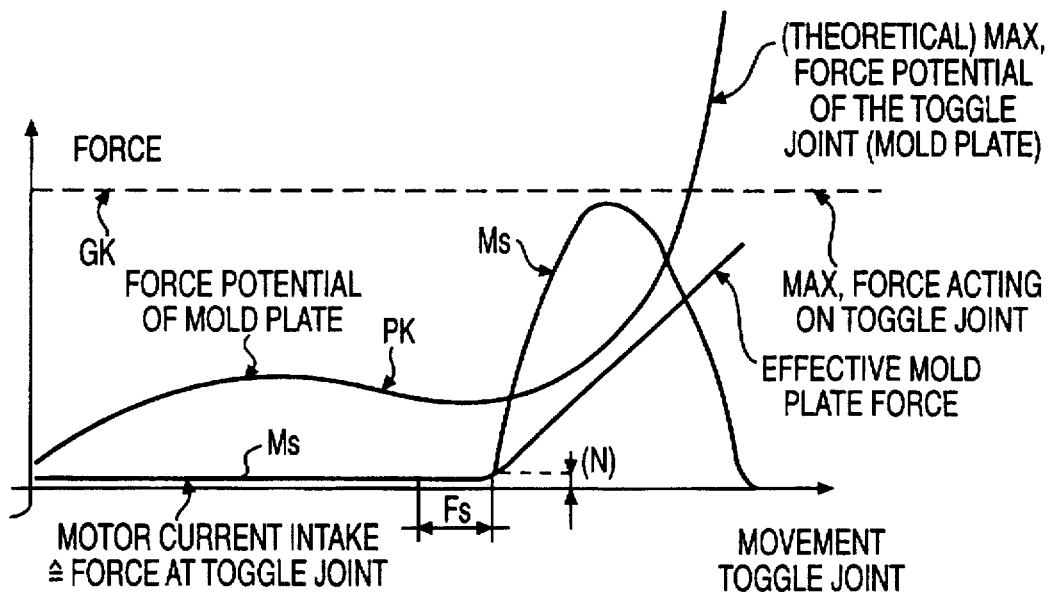
FIG. 16 is a diagram illustrating the force flow during a mold closure operation.

FIG. 16 depicts the known force curve in an injection molding machine during a mold closure movement. Gk represents the maximum force exerted on the linkage head. Pk depicts the force characteristic of the toggle link on the moved plate. Ms is the motor current input over the entire closure movement. The course of the curve essentially corresponds to the force acting on the joint, with resulting inertial forces superimposed on the depicted curve, for instance as shown in FIG. 16a.

Figure 16A:
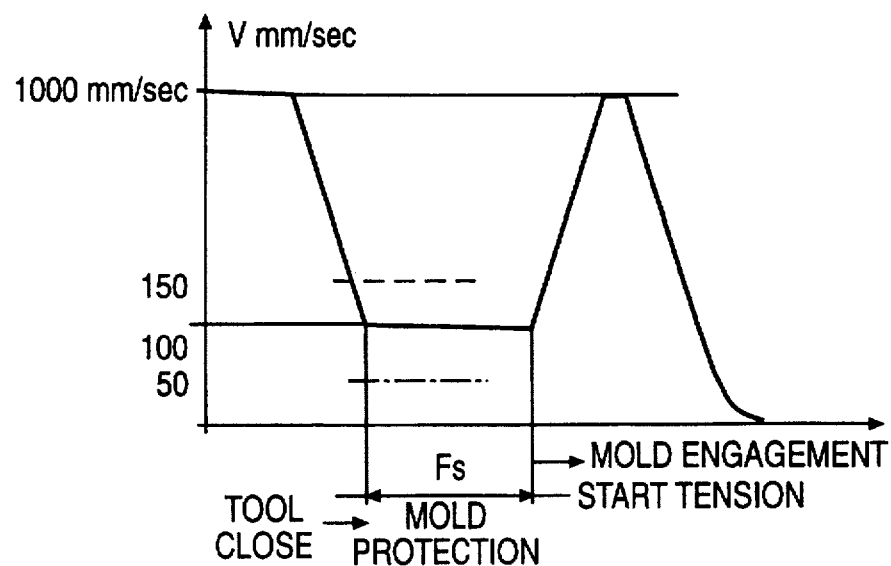
FIG. 16a is a diagram depicting the velocity across the protective path of a mold.

FIG. 16a depicts the velocity pattern (V) at the toggle linkage, for instance over the path and, more particularly, over a sensitive and monitored mold protection path (Fs).

Figure 16B:
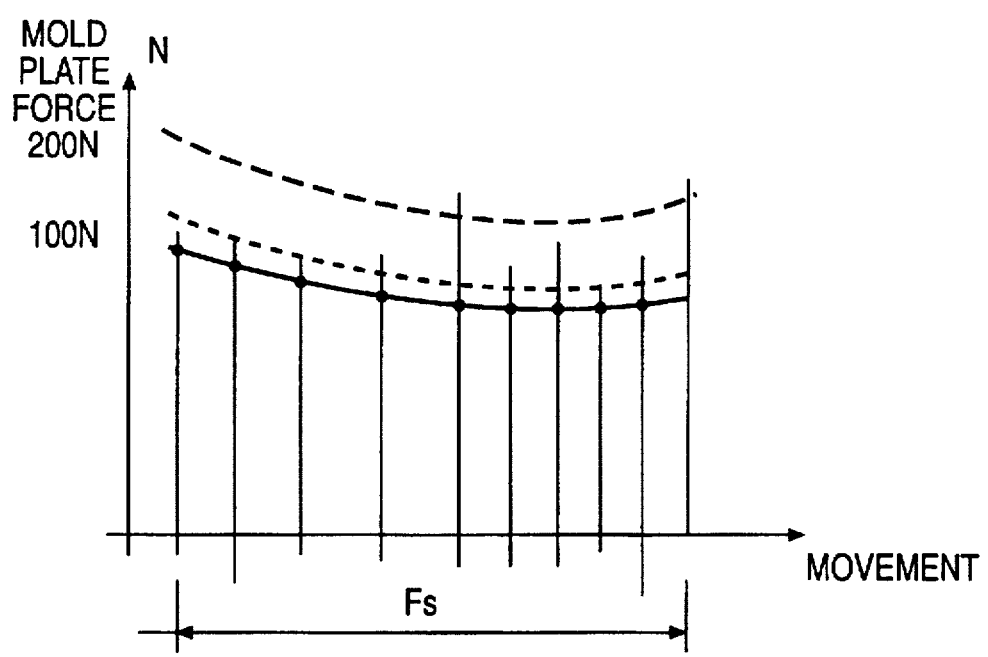
FIG. 16b is a diagram depicting the force across a protective mold path.

FIG. 16b more particularly depicts the force pattern over the sensitive path which, between the two mold sections, may be in the range of 100–200N, for instance, as may be demonstrated by the so-called cigarette test. The great advantage resides in the fact that at a strongly reduced velocity a short brake track may be assumed in case of a disturbance, because the masses, by invoking the maximum possible retarding force of the motor may be brought to rest, so that sensitive ejection pins of the mold may be protected from destruction and the mold may be opened.

It will thus be seen that the invention the scope of which has been set forth in the appended claims, provides for a injection molding machine operated by multiple axles or drive shafts driven or actuated by rotary electric motors, under the open and/or closed loop control functions and apparatus described supra. It will be apparent to those skilled in the art that modifications and alterations of the apparatus and operational methods herein described are possible without departing from the spirit and scope of the invention.

What is claimed is:

1. Apparatus for controlling an injection molding machine having an electric motor connected to drive an injection molding machine axle selected from the group consisting of an injection axle, a closure axle, an ejection axle, and a carriage unit axle, and a machine computer having an associated memory, the machine computer and associated memory for providing target values for one or more of motor control parameters selected from the group consisting of motor phase angle ($\phi$, motor current I, and motor velocity V, the apparatus comprising:

a motor control drive operatively interconnected with the electric motor connected to the selected injection molding machine axle and with the machine computer, said motor control drive further including, (i) a drive computer separate from the machine computer, (ii) a recipe memory separate from said associated memory and operatively directly connected to said drive computer and connectable to the machine computer, said recipe memory configured to store the target values supplied by the machine computer, (iii) a selective multiple open and closed loop controller directly interconnected with, and coordinated by, said drive computer, said multiple controller including a motor phase angle $\phi$ controller, a motor current I controller, and a motor velocity V controller, wherein said interconnection between said motor control drive and the electric motor includes a signal connection and a feed back connection, and wherein said drive computer provides high velocity selective open and closed loop control of one or more of $\phi$, I and V and derives necessary target value input from data stored in said recipe memory.

2. The apparatus as in claim 1 wherein the machine has a plurality of electric motors each controlling a respective axle, and wherein the closed loop control drive includes the same plurality of multiple open and closed loop controllers each interconnected with said drive computer and a respective one of the electric motors.

3. The apparatus as in claim 1 wherein the machine has an axle position sensor for providing an axle position signal, and wherein said control drive is operatively interconnected with said axle position sensor and includes a signal processor interconnected with said drive computer, said drive computer also providing closed loop axle position control.

4. The apparatus as in claim 3 further including a data bus for interconnecting the machine computer and the position sensor with said drive computer.

5. The apparatus as in claim 1 wherein said motor control drive is housed in a single module.

6. The apparatus as in claim 2 wherein the machine has respective axle position sensors for the plurality of axles, the axle position sensors being operatively interconnected with said drive computer, wherein said control drive includes a signal processor interconnected with said drive computer, and wherein said drive computer provides closed loop control of the axle positions.

7. The apparatus as in claim 6 wherein the position sensors and the machine computer are interconnected with said drive computer by a data bus.

8. The apparatus as in claim 2 wherein said motor control drive is housed in a single module.

9. The apparatus as in claim 1 wherein the machine is a plastic injection molding machine.

10. The apparatus as in claim 2 wherein the machine is a plastic injection molding machine.

* * * * *